US007348961B1

(12) United States Patent
Shneidman

(10) Patent No.: US 7,348,961 B1
(45) Date of Patent: Mar. 25, 2008

(54) TELESCREEN OPERATING METHOD

(76) Inventor: Jonathan Shneidman, 1347 Kellerm Ave., Los Angeles, CA (US) 90026

( * ) Notice: Subject to any disclaimer, the term of this patent is extended or adjusted under 35 U.S.C. 154(b) by 0 days.

(21) Appl. No.: 09/258,601

(22) Filed: Feb. 26, 1999

(51) Int. Cl.
*G09G 5/00* (2006.01)
(52) U.S. Cl. ...................................... 345/156; 345/172
(58) Field of Classification Search ................ 709/200, 709/202, 206, 217; 345/336, 338, 340, 347, 345/341–346, 1.1, 156–184, 2.1; 375/226, 375/50; 379/88.17; 370/352, 353, 354, 370/355, 356, 357, 358; 707/501.1
See application file for complete search history.

(56) References Cited

U.S. PATENT DOCUMENTS

| 5,557,658 | A | * | 9/1996 | Gregorek et al. ...... 379/215.01 |
| 5,710,887 | A | * | 1/1998 | Chelliah et al. ............ 345/835 |
| 5,812,776 | A | * | 9/1998 | Gifford ........................ 709/217 |
| 5,877,757 | A | * | 3/1999 | Baldwin et al. ............ 345/705 |
| 6,021,119 | A | * | 2/2000 | Derks et al. ................ 370/261 |
| 6,173,272 | B1 | * | 1/2001 | Thomas et al. ............... 705/42 |
| 6,266,539 | B1 | * | 7/2001 | Pardo ....................... 455/556.2 |
| 6,338,085 | B1 | * | 1/2002 | Ramaswamy ............... 709/217 |
| 6,349,324 | B1 | * | 2/2002 | Tokoro ....................... 455/3.03 |
| 6,519,616 | B1 | * | 2/2003 | Zamora-McKelvy et al. ........................ 715/501.1 |
| 6,718,015 | B1 | * | 4/2004 | Berstis ..................... 379/88.17 |

* cited by examiner

*Primary Examiner*—Nitin I. Patel
(74) *Attorney, Agent, or Firm*—Chen Yoshima LLP

(57) ABSTRACT

The present invention relates to a communications system for distributing information to and from local and regional distribution centers as well as individual dial-up servers. The communications system contains an interactive, configurable interface. The first aspect of the invention employs a method and device for communicating information between computers, where a first computer unit, comprising a touch sensitive screen for displaying images, a processing unit and a communications port, connects to a telephone line. The second computer unit pushes data and images to be displayed on the first computer unit's touch sensitive screen with identifying codes associated with a definition of active areas. When an active area is selected, the first computer unit returns the code associated with the active area. In this way pushed data and interactive communications between the points are achieved. The first computer is a specially designed device that facilitates the multifaceted communication between the two computers and presents a highly functional interface using a number of input and output devices.

34 Claims, 15 Drawing Sheets

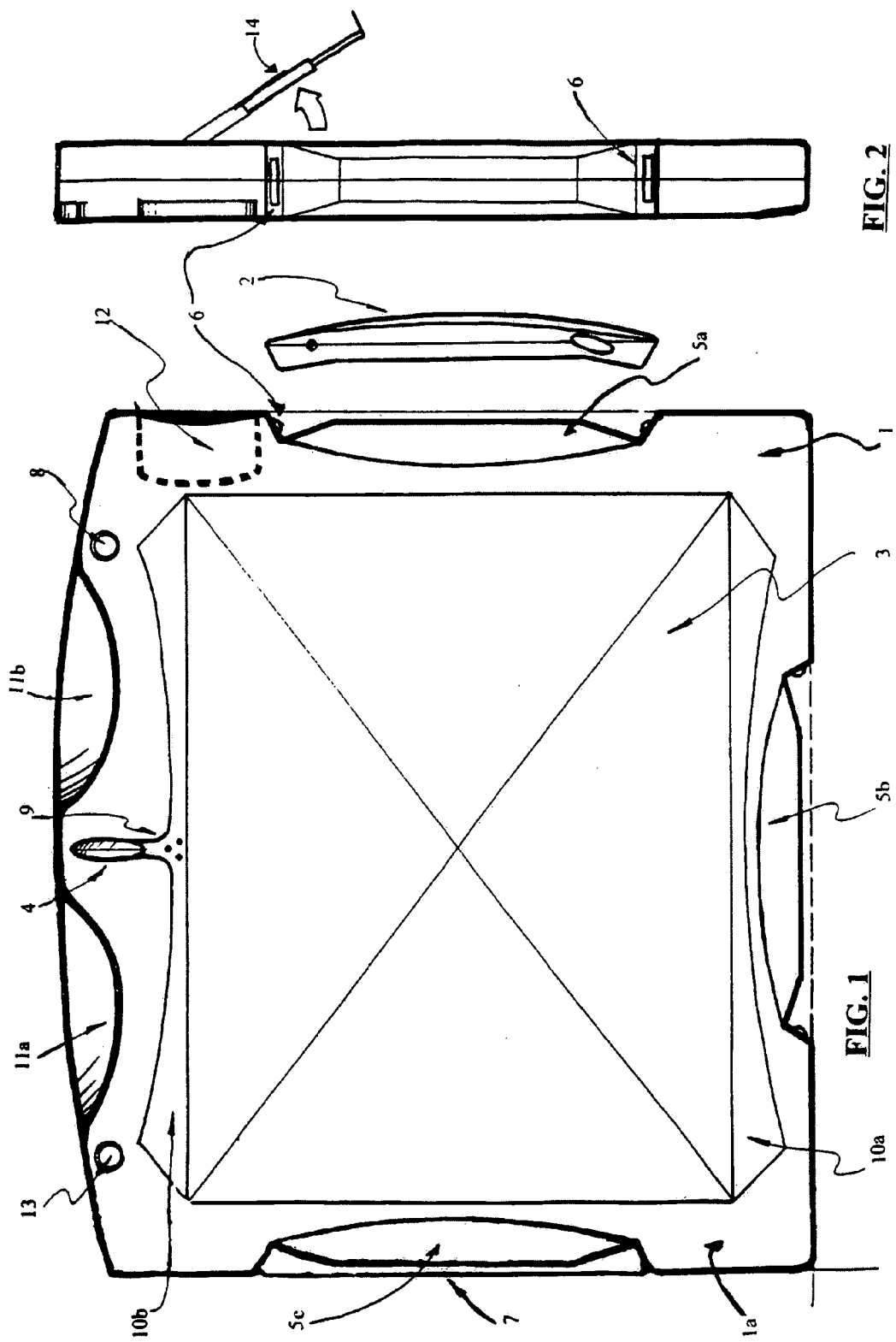

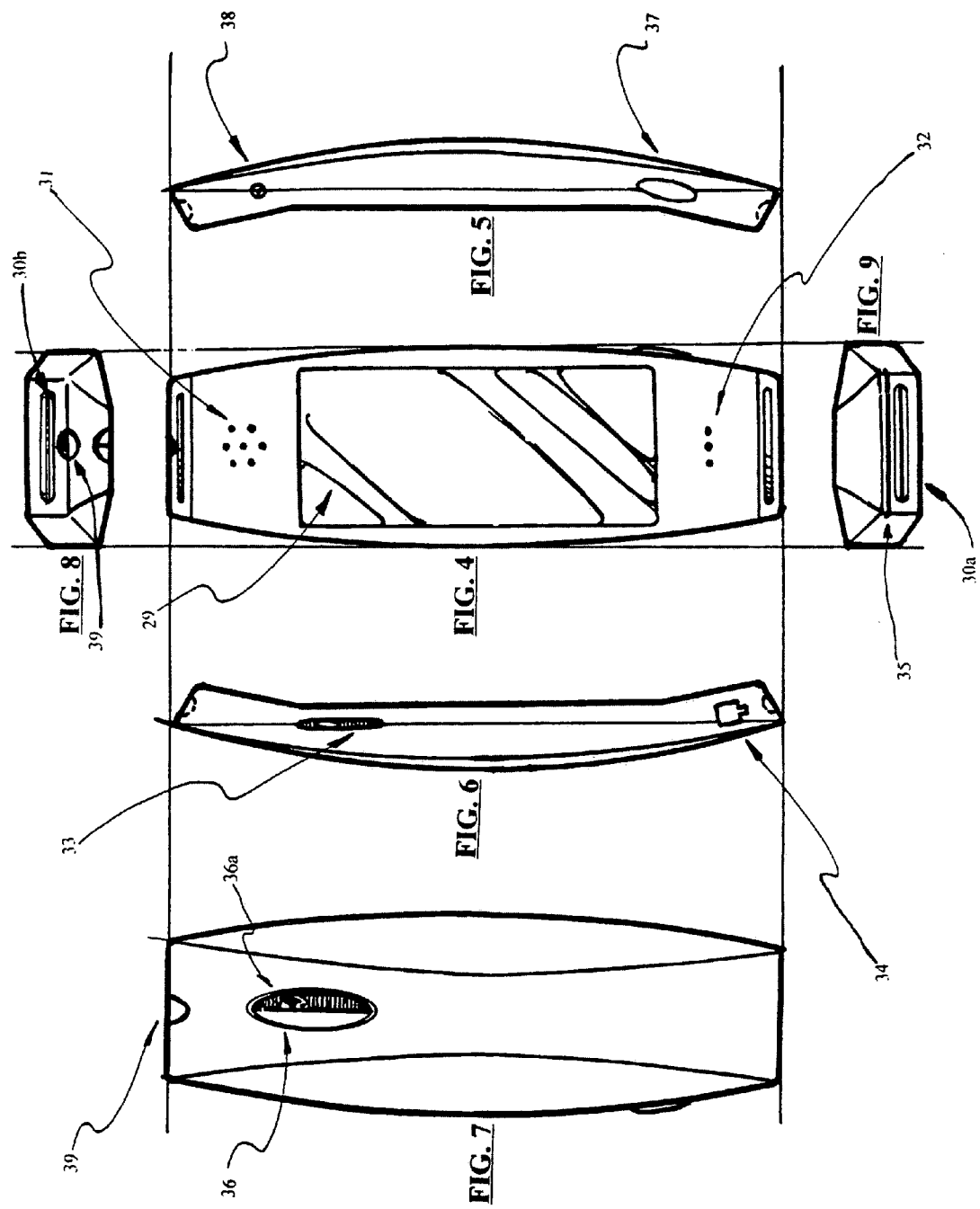

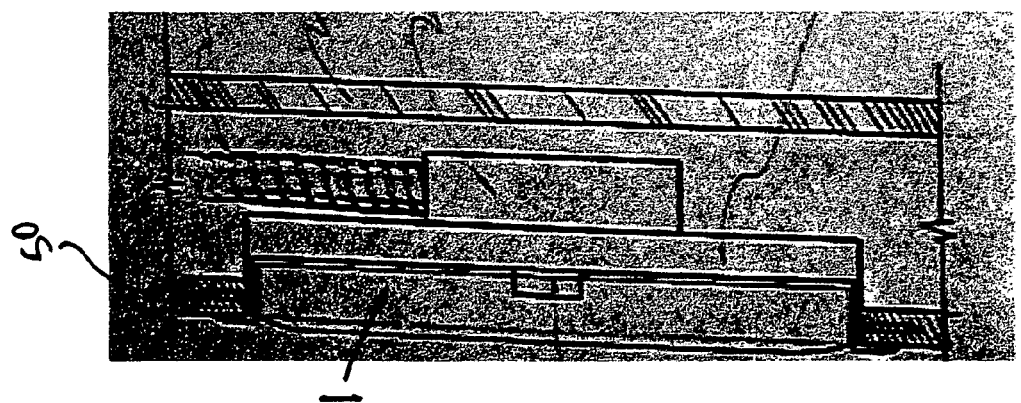

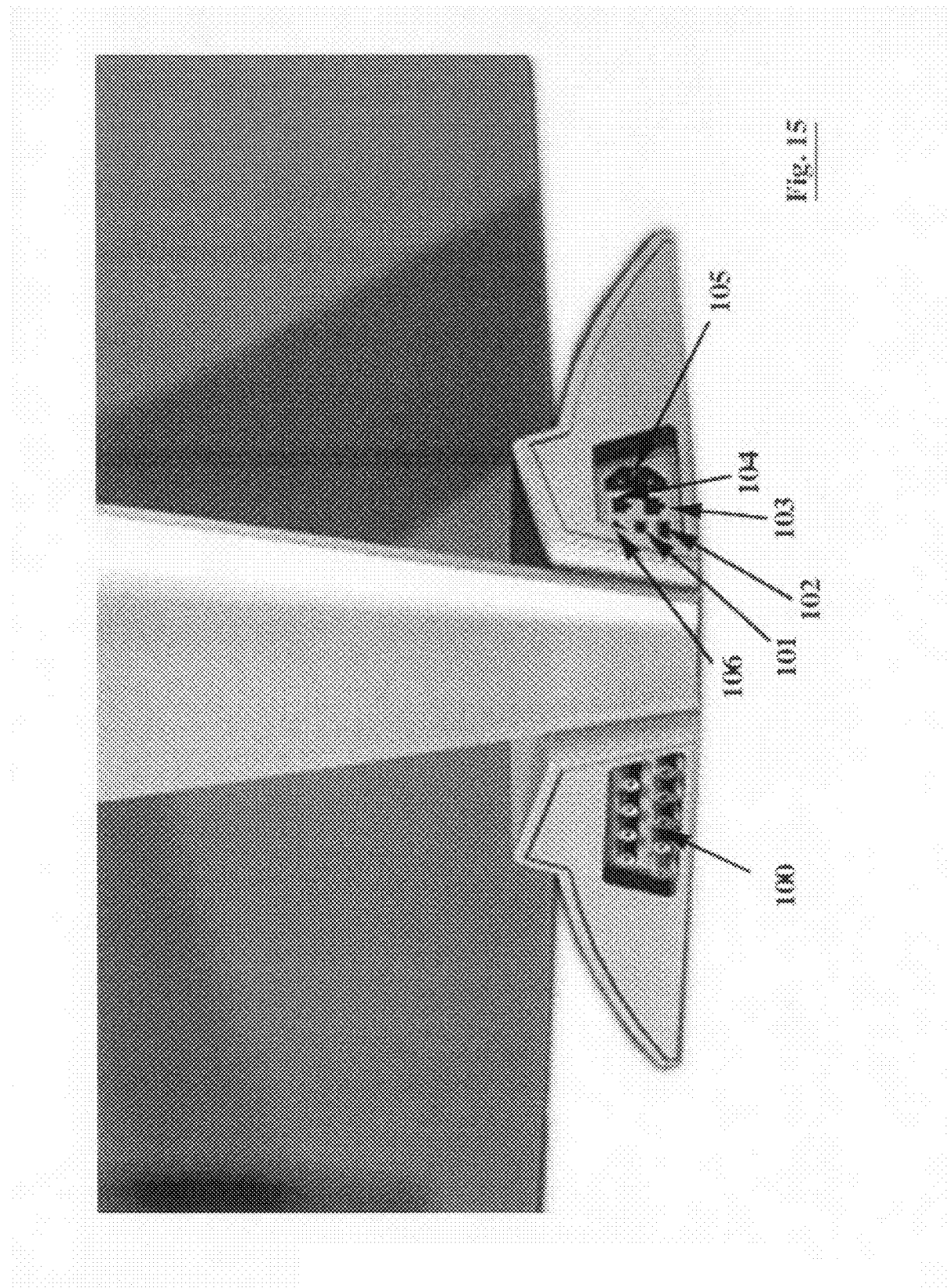

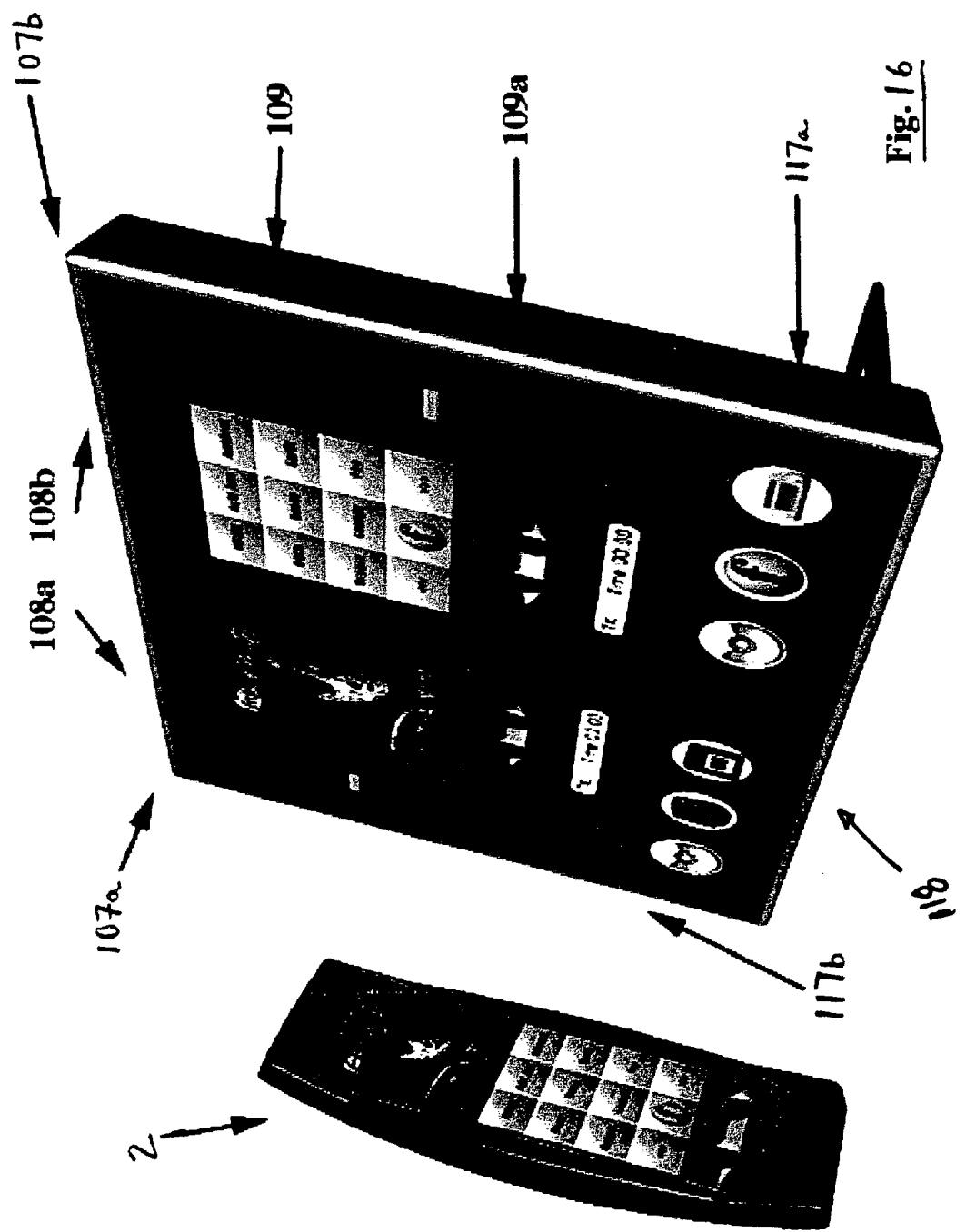

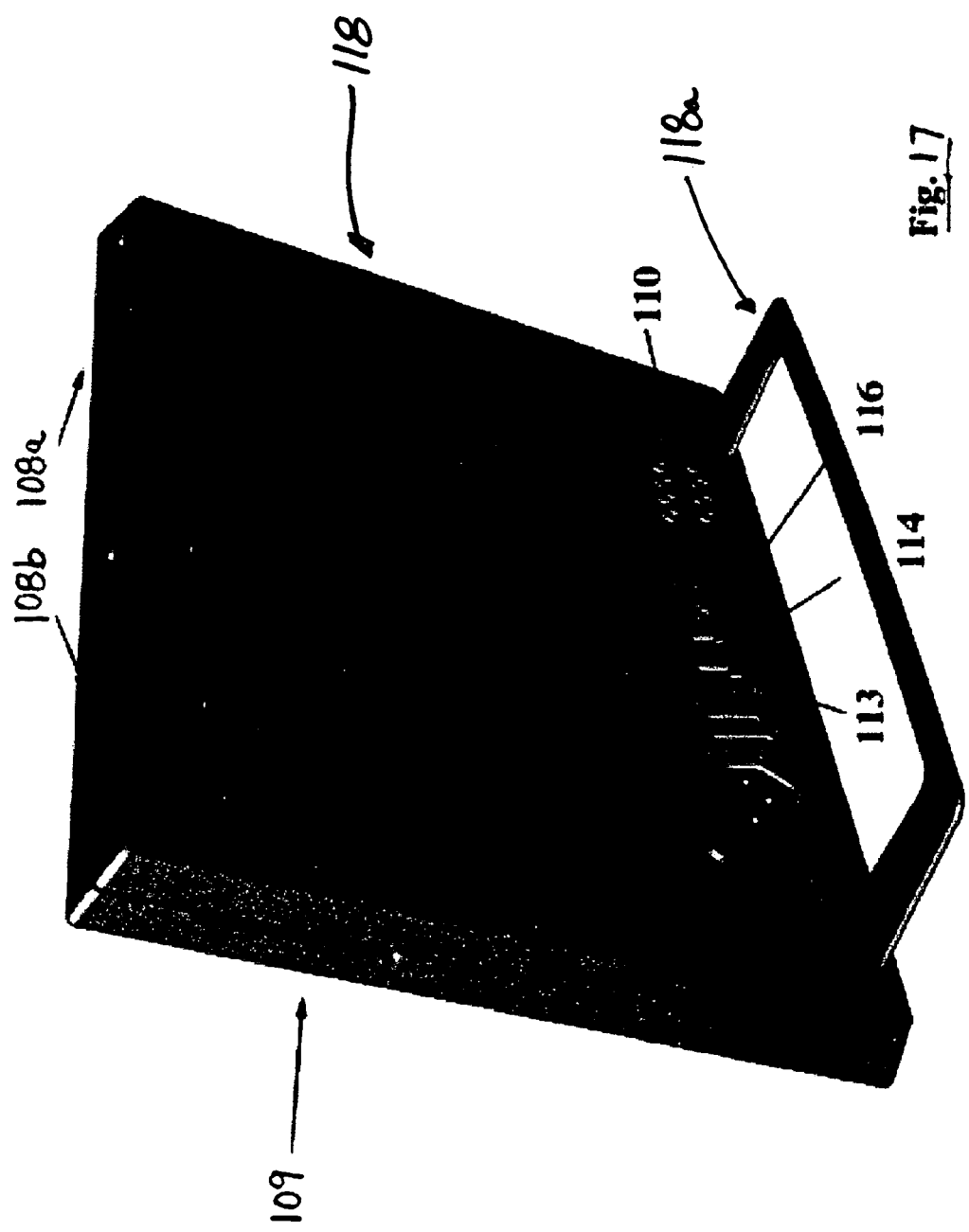

TELESCREEN OPERATING METHOD

BACKGROUND OF THE INVENTION

1. Field of the Invention

The present invention relates to a communications system for distributing information to and from local and regional distribution centers as well as individual dial-up servers. The communications system contains an interactive, configurable interface.

2. Description of the Related Art

The digital networks that are currently in operation allow end-user's computers, such as personal computers (PC's), laptops, palm PC's and digital assistants, to communicate with servers of information by transmitting signals through a number of mediums including twisted-pair, broadband cable, satellite communications, and infrared and cellular technologies. In the last decade there has been a convergence of all types of communication signals into the digital format. In addition, new technologies have vastly improved the effective transmission rates of analog and digital communications. Great strides in efficiency and interoperability have been made in the telephone, television, satellite, optical transmission and cellular communications.

Computer networks have communicated by digital transmissions for many years. The efficiencies gained by the use of digital transmission technologies, such as encoding and compression, in computer networks has led to a digital revolution in all communications fields. The communications advance has produced the means for transmitting a wealth of information to an end-user or consumer of information. Every day content providers are creating new formats for existing information and otherwise creating content to sell or transmit to end-users. In addition, personal communication technology has diversified to include telephones, pagers and personal assistants, including voice messaging systems and E-mail capability. Personal communications may be in digital and analog format and communicated through a plethora of media, including twisted pair, broadband cable, fiber-optic, cellular, and satellite (including geosynchronous and low orbit systems).

Currently, the end user sends and receives personal communications and information by a number of sources including telephone, pager, radio, television, internet access, each having a number of modes of delivery (i.e. telephony, RF and microwave broadcast, cellular technology, broadband and fiber-optic cable and satellite transmissions). A telephone communications system alone may use all of the aforementioned communication medium. It is anticipated that many types of information systems will continue the current trend of expanding their distribution channels to include more communications mediums and formats. For example, the expansion of television content distribution from analog RF broadcast to the cable and satellite technologies and to the digital format.

As each type of information is manipulated to conform to the requirements of efficient distribution and communication across the various media, there is a growing recognition that there are advantages to be gained in the convergence of information sources and distribution media.

Current convergent systems, however, fail to provide the integration to take advantage of the synergies that may be achieved between the various types of communications available, namely the operation by non-computer literate, handicapped or physically challenged individuals. Set-top boxes, allowing cable television operators to provide internet access and modems' digitalization of the signals across telephone lines to provide inter-computer communication, fail to provide an integrated solution taking advantage of the directed use of the personal communications and the broadcast nature intended by many of the content providers. Current integration devices merely build upon existing technology, such as television or the personal computer.

SUMMARY OF THE PREFERRED EMBODIMENTS

The first aspect of the invention employs a method of communicating information between computers, where a first computer unit, comprising a touch sensitive screen for displaying images, a processing unit and a communications port, connects to a telephone line. The first computer unit electronically dials a telephone number associated with a second computer unit and establishes a communication path. The second computer unit pushes data and images to be displayed on the first computer unit's touch sensitive screen across the communications path. The second computer unit pushes identifying codes associated with a definition of active areas of the first computer's touch screen such that, when selected, the first computer unit should return the code associated with the active area touched to the second computer unit. The first computer unit displays the images pushed to it across the data path. The first computer unit monitors the active areas for a selection action. The first computer unit registers the selection action in the active area and communicates the code for the active area selected to the second computer unit.

Further, the method of communicating information between computers may include the first computer unit sending information to the second computer unit corresponding to a charge account. The second computer then receives the information corresponding to a charge account and sends a confirmation to the first computer that the charge account information was received and a purchase of goods has been completed. The selection action registered is a user touching one of the active areas of the first computer's touch screen. Alternatively, the first computer unit has a remote control unit comprising a touch screen that maps to some portion of the first computer unit's touch screen. The selection action registered then may be a user touching an area of the remote control unit's touch screen that maps to an active area of the first computer's touch screen.

Another aspect of the inventive method is a method of controlling a computer connecting the computer unit, comprising a touch sensitive screen for displaying images, a processing unit and a communications port, to a telephone line. Dialing a telephone number associated with a server unit. Establishing a communication path between the computer unit and the server unit. Receiving data and images pushed by the server unit. Displaying on the computer unit's touch sensitive screen the images received. Receiving a description of active areas of the computer's touch screen pushed by the server unit corresponding to the data and images received by the computer unit. Monitoring the active areas of the computer's touch screen for a selection action. Registering a selection action in one of the active areas. Communicating to the server unit a code corresponding to the active area selected. Receiving data and images from the server unit corresponding to the active area selected. Displaying on the computer unit's touch sensitive screen the images received. And, receiving a description of active areas of the computer's touch screen received by the computer unit.

The second aspect may further include sending information to the server unit corresponding to a charge account. Receiving a confirmation from the server that the charge account information was received and a purchase of goods has been completed. And, the selection action registered is a user touching one of the active areas of the computer's touch screen. Alternatively, the computer unit has a remote control unit comprising a touch screen that maps to some portion of the computer unit's touch screen and the selection action registered is a user touching an area of the remote control unit's touch screen that maps to one of the active areas of the computer's touch screen.

The novel features of the invention are set forth with particularity in the appended claims. The invention will be best understood from the following description when read in conjunction with the accompanying drawings.

BRIEF DESCRIPTION OF THE DRAWINGS

FIG. 1 shows the front view of one embodiment of a Telescreen unit and depicting the attachment location of the handset.

FIG. 2 is the right side view of the Telescreen unit depicting the telescoping support leg and the docking channel in the Telescreen unit.

FIG. 4 shows the front view of one embodiment of a handset.

FIG. 5 shows the right side view of one embodiment of a handset.

FIG. 6 shows the left side view of one embodiment of a handset

FIG. 7 shows the rear view of one embodiment of a handset

FIG. 8 shows the top side view of one embodiment of a handset.

FIG. 9 shows the bottom side view of one embodiment of a handset.

FIG. 14 shows the Telescreen wall mounted.

FIG. 15 is an alternate configuration of the base unit shown in FIG. 3.

FIG. 16 shows an embodiment of the SLIM Telescreen with handset/remote.

FIG. 17 shows back view of the SLIM Telescreen embodiment.

DETAILED DESCRIPTION OF THE PREFERRED EMBODIMENTS

Introduction

Figure 3:
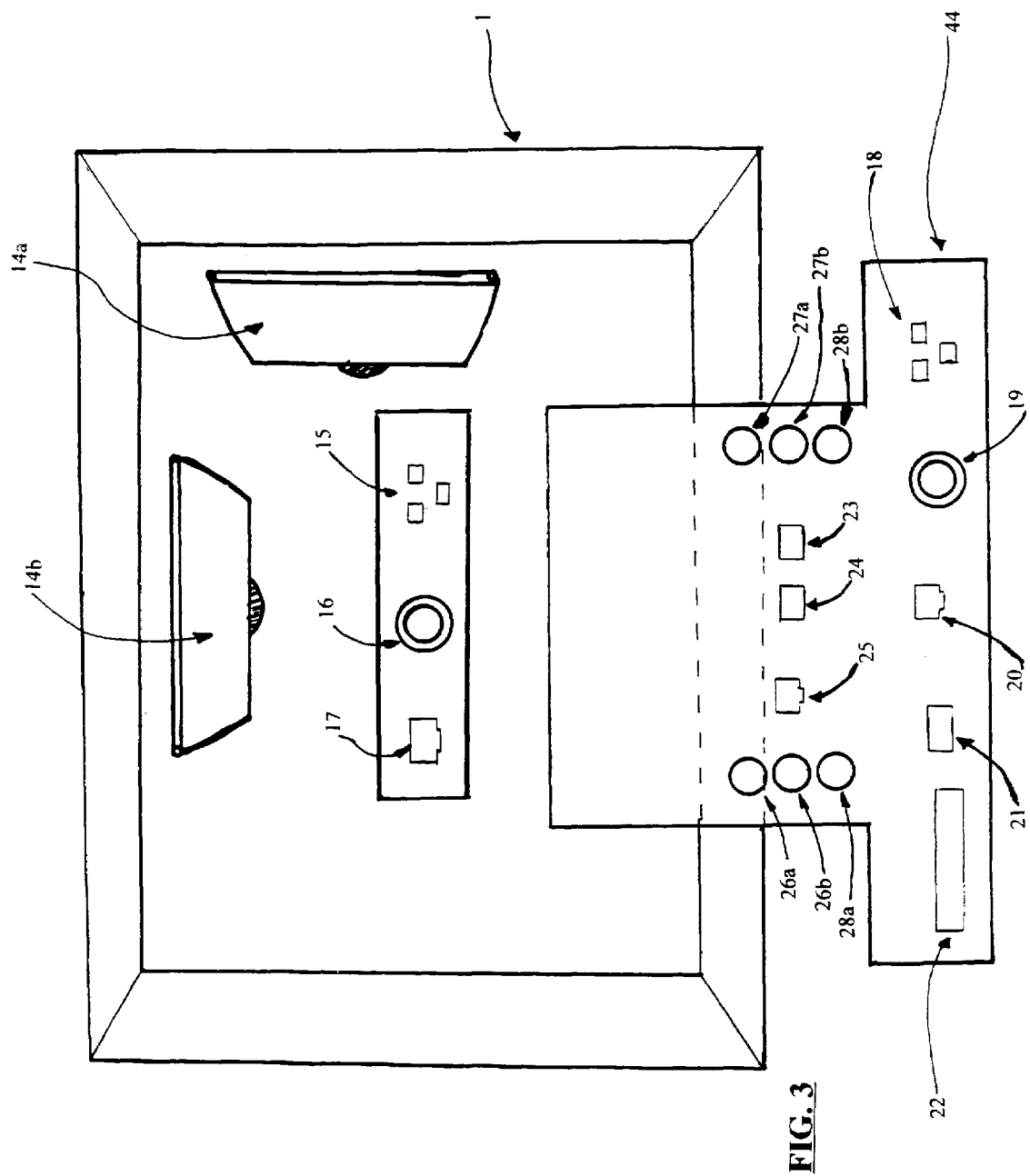
FIG. 3 shows rear view of the Telescreen unit and the base Unit, depicting the connection plugs in the back of the Telescreen unit to connect it to the base unit and the connection plugs in the back of the base station to connect it to the various input and output devices.

The present invention has been made in view of the above problems in the art, and has an object of providing an integrated communications system for individual use. An embodiment of the invention, a Telescreen unit, brings together into one unit many communications functions that have been provided by separate units in the past, allowing those with no computer skills to communicate, store and retrieve data with the familiarity of only the telephone.

The creation of a simplified platform for communication affords the opportunity to not only communicate with voice but also to see any information the company or individual on the other end would like you to see. For example, dialing 1-800-NEW-AUTO on the handset or screen and you are connected to an operator or voicemail system. At the same time, whatever new car you would like to see, appears on the screen. The information displayed on the screen include video push for the retailer. Video push is the process of sending a video transmission to the Telescreen user, without the Telescreen user requesting the transmission. Thus, a video presentation, much like a television commercial, may be sent for display on the Telescreen user's screen. Such pushed video could be much like what may be seen on the home pages of the major car manufactures on the world wide web. When you ask to see a particular new car, it appears on the screen. You also have the choice to see a video, look at specifications, etc. When you ask to speak to a sales representative, one gets on the line or the call is forwarded to a local dealer.

A platform in accordance with the present invention provides an environment where individuals and businesses with or without computer skills can store and retrieve data whenever and wherever they see fit. This can take place either through a telephone, cell phone, the Telescreen or a combination thereof. Similar to interfacing with an ATM machine, individuals will be able to access not only financial information but also their phone book, calendar, unified messages, personal/business information, music, mass media, etc. To keep this information private, several safeguards have been built into the system, i.e., radio frequency identification, smart cards featuring active encryption and pin numbers. The combination of these safeguards make the system as secure as the user would like.

Another aspect of preferred embodiments creates personal accounts for individuals and businesses thereby providing interfaces and modes of interaction highly personalized to the individual. If you love cats, screens can feature cats. If you are elderly, type can appear larger and automated voices can talk to you slower. If you are dyslexic, type can appear phonetically. By first identifying yourself to the system, interactive voice response's (IVR's) effectiveness is increased.

The Telescreen main unit may detach from the base unit and comprises a touch sensitive liquid crystal display (LCD) or plasma screen, two optical disk read or read/write units, mini-ROMs, an optical-magneto card reader, video encoding/decoding chip sets, administrative operating system (OS) and communications chipsets, thin overlay chip sets for the touch screen, RAM and Hard Drive memory devices and communications input and output ports for a number of communications formats and protocols. This singular integrated Telescreen unit is able to perform the functionality of a telephone (including wire connected, cellular phone, and satellite), message answering machine, voicemail, television (including broadcast content and on demand content, distributed by RF, cable, and satellite, in signals that may be digital or analog), radio (including broadcast and on demand music or other content), a personal computer with internet access, a tablet notebook computer and a digital camera.

The handset alone functions as a telephone and communicates with the Telescreen unit by infrared signaling or by cordless technologies, when in range. Optionally, the handset may serve as a cellular phone and as a low orbit satellite telephone communications device. In a power outage the handset may be directly plugged into a phone-jack with the use of a telephone line and serve as a hand held phone.

The handset comprises a touch sensitive LCD or plasma display of which a portion maps to the touch screen on the main touch screen unit for many of its processes. The handset functions as a remote control unit for the touch screen used to control the larger unit. The handset is itself a palm computer capable of performing the functions of a computerized personal assistant. It is capable of receiving radio transmissions or providing on demand digital music or other audio content to the user though a headphone jack. The handset may function as a digital camera, capturing images to be uploaded to the Telescreen unit. The handset has GPS (Global Positioning Satellite/System) technology onboard to allow the unit to detect its position and communicate that position to the user and to the Telescreen or base station. Further, a laser scanner is included in the handset to provide data entry in forms such as bar codes.

One function of the Telescreen is to receive video push and data push through a telephone communication. When the user dials a telephone number the Telescreen has the ability to interact with the system resident at the number dialed or contacted through that number. The system contacted will act as a server that transmits information to the user's Telescreen. The Telescreen will receive customized screens and other graphical and audio information through the telephone communication for display on the user's Telescreen. Such graphical and audio information may be interactive menus when calling a restaurant or more complex information including interactive full motion video and smart video streaming (SVS).

Another optional function of the Telescreen is to automatically report utility usage when a home unit is polled. The Telescreen unit is electronically connected to meters that measure and report usage of utilities supplied to the home, i.e., electricity, gas, and water. The Telescreen is then polled by the utility company for a report of usage for a given time period which it then sought from the in-home meter and then reported to the utility company. The polling communication may be over telephone or broadband communications that connect the Telescreen to outside PBX switches or servers. The in home meters communicate with the Telescreen by direct wiring or wireless communication.

The Telescreen itself preferably has three docking stations for the individual handsets, which docking stations provide for charging of the handset, downloading information from the handset to the Telescreen unit and uploading of information to the handset. The uploading and downloading of information may be done without docking the handset in the Telescreen unit as data communication may be handled through cordless communication, infrared signaling, cellular communications or even by satellite communication. The handset may be charged remotely by either RF or laser charging technologies.

The docking stations for handsets and base stations for the Telescreen units may be provided at public kiosks allowing the units to be charged and the users to connect to the information systems using their own unit. It is through the base station that access to the outside servers is normally achieved, however, both units are capable of communicating the desired content to the user by remote access through cordless, cellular and optionally satellite communication systems.

The Telescreen and handset provide an individual interactive access to a number of personal and broadcast communication systems as well as integrating the functionality of an advanced personal computer. As an individual's central source to information, the system has many security and identification features. The Telescreen unit and the handset contain an optical-magneto card reader that would allow the insertion of a SmartCard to identify the user and set the security level. In addition, the Telescreen unit has an optional radio frequency identification unit that may restrict access to the user in possession of an individual radio frequency identification key. As well as security features, the SmartCard and radio frequency identification systems would allow the user to be identified by the system and allow the system to present individualized display screens and set the user's preferences throughout the unit's functioning.

The first aspect of the invention employs a method of communicating between a Telescreen, a multiprocessing, multitasking communications device featuring a touch sensitive handset and screen, and the current telephony, IP Internet, and entertainment distribution infrastructure. As will be further described below in relation to FIG. 1, the Telescreen is able to simultaneously connect and process information from a POTS line, DSL, ATM, coax, satellite and cellular as well as additional emerging communication technologies through a variety of ports on the unit and breakout boxes.

The Telescreen contains several independent subsystems operating simultaneously. Each system has one or more independent chipsets, RAM, hard drives and BIOS running. These subsystems communicate with each other through IP and/or other protocols.

System 1) MPEG 3+ broadcast quality Audio and Video System.

A multiprocessing chipset allowing for real time multi layer video stream selection and manipulation. The Telescreen can receive and generate analog and digital audio and video streams. With all incoming A/V streams active, the user may layer and manipulate these streams as with a high-end professional real time broadcast video editing system. The Telescreen also offers external A/V machine control and connectivity.

The Telescreen unit 1 can receive and layer Smart Video Streams (SVS)-digital video encoded with copyright encryption as well as interactive information defining active areas on a touch screen 3. Interactive icons can be activated through the touch screen, the handset or through IVR. If the Telescreen user has created a personal profile the SVS can supply customized programming, commercials and icons for the end user.

The Telescreen also identifies a standard video and or audio stream, checks this channel or network against an internal, updateable database and calls out a corresponding 'web page', if available, from a www server. This 'web page' appears as only an icon in a "clear" browser overlaying the video. When selected, information can be sent out to the server. This method creates a form of interactive TV. If the Telescreen user has created a personal profile, the video and icons can be customized for the end user.

The Telescreen can also automatically and transparently identify current media such as audio CDs and DVDs, communicate with a remote server, download additional information and graphics about the titles and use this information to create multi-searchable jukebox type applications.

System 2) IP chipset running, RAM, HD (hard disk). Comport (communication port).

This system runs a clear browser allowing for applications to pick standard web browsing or to create isolated "icons" to be placed on the screen over System 1's video layer.

System 3) Standard and IP telephony system including rate negotiating chip set, RAM, HD.

When the Telescreen user dials a standard 7+# sequence or activates an associated icon through the touch screen, the handset or IVR, the Telescreen checks that # against an internal and updateable database, linking the dialed number with a www address if available. As the call is connected the corresponding web page is called up appearing in a browser on the Telescreen's touch screen and, if desirable, on the handset as well. This creates a wide range of functionality, communication and commerce options currently associated with www, call center and other telephony technologies. These functions include consumers being able to interact directly with various banks and manufacturers.

System 4) Utility metering—chipset running, RAM, HD. (gas, water, electric). Municipalities link their utilities to a Telescreen system to automatically read meters, generate bills and receive payment.

System 5) Standard OS as personal computer, Chipset running, RAM, HD,

System 6) Machine Control BIOS/subsystems/ camera/ radio frequency identification/ handset/ microphone/speakers/ SmartCard.

System 7) Standard IP chipset running, RAM, HD, www browser.

System 8) Touch screen Control chipset running, RAM, HD (multi-layer allowing for multiple simultaneous touch points).

System 9) Home control chipset running, RAM, HD, appliances, A/V, environmental and security systems.

System 10) Telescreen Administration chipset running, RAM, HD.

The second aspect of the invention employs a method of communicating between two or more Telescreens.

When the Telescreen communicates with another Telescreen, the receiving unit allows the user to teleconference with or without seeing the other person. Users can share documents, media and screens if they wish. The Telescreen also acts as a visual answering machine. The Telescreen that initiated the call receives images as well as audio from the second Telescreen.

The initiator of the call may leave a message or navigate through the receiving unit's site.

Teleconferencing with several different units is also possible.

The third aspect of the invention demonstrates an environment the Telescreen creates in which personal, academic and business interfaces are practical.

The Embodiments

The first embodiment of the Telescreen 1 is shown in FIG. 1 in the horizontal orientation. In this orientation, a 17-inch touch screen 3, preferably plasma, is disposed within Telescreen casing 1a with its longer dimension extending horizontally when the power button 4 is centered and at the top of the display. This embodiment emulates the orientation of standard displays for personal computers and televisions. The Telescreen casing is preferably constructed of high impact plastics and high tech metals to create a light and durable casing. The Telescreen casing may be stylized and constructed of different materials and colors, and follow different designs to suit individual tastes of purchasers. Further, the Telescreen casing 1a, may be specifically designed for a particular purpose, e.g., a white casing that is water resistant for hospital use. Protected by the Telescreen casing 1a, the Telescreen contains video encoding/decoding chipsets, administrative OS chipsets, communications chipsets, thin overlay chipsets for the touch screen 3, and RAM and hard drive memory devices. The video encoding/decoding chipsets preferably provide MPEG 2+ encoding and decoding. The OS chipsets provide the operating system and the central file handling. The overlay chipsets handle the logical second touch sensitive layer of the touch screen, detailed below. The RAM memory is any random access memory, including DRAM, SRAM, SDRAM and flash memory. Preferably, the hard drive units are two 40+ gigabyte hard drives. However, one skilled in the art would appreciate that the maximum size hard drive available at the time the Telescreen is built is likely to be preferable.

The first embodiment of the handset 2 is shown detached from the Telescreen and in the approximate orientation necessary for it to be snapped into the docking station 5a. The handset 2 is itself preferably constructed of high impact plastics and lightweight metals to create a light and durable casing. The handset may be stylized and constructed of different materials and colors, and follow different designs to suit the individual tastes of purchasers. Further, the designs may take advantage of the handset's position while snapped into the Telescreen unit by providing a grip for the Telescreen and blending with its color scheme.

There are three docking stations in the Telescreen 1 disposed on the right 5a, bottom 5b and left 5c sides of the Telescreen casing 1a. The docking stations have spring-loaded dowels 6 that facilitate handset 2 capture and charging. When the docking stations do not have a handset 2 docked in the station, there are snap-in covers 7 that protect the dock. These snap-in covers 7 may provide grips for the unit, blend with the color scheme of the Telescreen or even snap tightly into place making the docking station virtually undetectable.

Both the Telescreen 1 and handset unit 2 have special touchscreens that allow for processing of multiple points of contact with the touchscreens. Preferably, this is accomplished by multiple thin layers of touch sensitive films being placed over the Telescreen's display surface. The multiple processing is accomplished by processing the first point of contact in the first, or upper most, layer. This position is noted as the first contact point and may be processed accordingly. The second contact sensitive layer is then scanned for a second contact point, masking out the contact information associated with the first contact point. Thus, if a standard keyboard is displayed on the touch screen 3, the area above the control key "Ctrl" may be pressed first and maintained as the "P" key is touched. The resulting input would be "Ctrl-P", just as this input sequence would be interpreted by a standard keyboard input device known in the art. Each additional layer would allow an additional simultaneous contact point to be determined by the touch sensitive screen 3.

Many functional features are integrated directly into the Telescreen unit. Preferably, a lens 8 for a digital camera housed within the Telescreen is set into the front of the Telescreen casing 1a. The camera and lens 8 allows the Telescreen to capture digital images and video that may be displayed on the plasma touch screen 3 and encoded into the digital video files or digital images for processing, storage or transmission. Images of documents may be processed by OCR (optical character recognition) software to translate the image into a document format. The images captured may be transmitted to connected servers and on to other Telescreen users. Thus, the Telescreen 1 functions much like a video phone in this mode. The images may also be transmitted to a user with security access, discussed below, to monitor the area in front of the Telescreen, including monitoring by displaying the images on a handset 2. Thus, an owner, or one with full access to the Telescreen unit may use the Telescreen unit to monitor the area within the view of the camera lens 8.

Audio is captured as well by a microphone 9 disposed in the upper center of the Telescreen casing 1a. Audio signals that may be encoded into the digital audio files or digital audio for processing, storage or transmission. Transmission of the audio files would be necessary, for instance, when the Telescreen is used as a telephone or videophone. Stored and received audio may be played through the stereo speakers 10a and 10b, set into the Telescreen casing 1a. When The Telescreen is used in the telephone mode, the microphone 9 and the speakers 10a and 10b function as a speakerphone.

Preferably, digital input and output to optical storage is provided by two read/writeable DVDs, 11a and 11b. As would be readily apparent to one skilled in the art, these optical units may be CD-ROM, WORM or another format, such as tape backup or flash memory, that provides input and output from a more stable media.

The Telescreen unit also may read and write to more static media thought an optical-magneto card unit 12. This card unit 12 may read and write optical-magneto cards as well as, read credit card type cards, debit cards, patient-identifying cards, SmartCards, and driver's licenses, etc. Online communication of information from debit cards, credit cards and other electronic money systems allows users to participate in commerce online or by telephone communication through the Telescreen. SmartCards and other security/identity card systems allow a level of security to be imposed upon users of the Telescreen. The Telescreen is able to lock out designated data in the absence of the security card. When the identity of the user is ascertained by the insertion of a card into the card unit 12, the Telescreen is also able to provide the individual's predefined interface screens and system preferences. The user may be ascertained by an identity card inserted into the handset 2 in a card slot 35 provided in that unit if the user be remotely controlling the Telescreen or if the handset 2 is docked in a docking station in the Telescreen.

A further security feature is a optional radio frequency identification unit 13 in the Telescreen. This radio frequency identification unit receives radio frequency identification signals emanating or reflected from a device personal to a user or class of users (for instance nurses or doctors). An example of such a system is the TIRIS™ system from Texas Instruments, where the device may be in the shape of a credit card or badge, a fob, jewelry or capsule. Such identification of the user serves the purpose of allowing, as above, the Telescreen to make security restrictions to data and functionality and to customize the interface for the particular user. Identity of the user in a home setting allows restrictions on certain Internet access for minors and V-chip restrictions on television content. In hospital settings, for instance, identification badges or cards could restrict patient data from being displayed or an unauthorized user access to data entry screens. In commerce, identification allows the proper account to be charged and customer profiles to be maintained.

Another optional function of the Telescreen 1 is to automatically report utility usage when a home unit is polled. The Telescreen unit is electronically connected to meters that measure and report usage of utilities supplied to the home, i.e., electricity, gas, and water. The Telescreen may be polled by a utility company for a report of usage for a given time period. The Telescreen seeks the usage data from the in-home meter and reports it to the utility company. The polling communication may be over telephone, cellular or broadband communications that connect the Telescreen 1 to outside PBX switches or servers which ultimately deliver the information to the utility company. The in-home meters communicate with the Telescreen by direct wiring or wireless communication.

FIG. 2 shows the Telescreen from the right side view. One of the telescoping legs 14 for horizontal table mount is displayed. The spring-loaded dowels 6 in the right side docking station 5a are shown. These spring-loaded dowels 6 facilitate holding the handset 2 or the snap-on cover 7 in place. Further, when a handset 2 is snapped into the docking station the dowels serve as contact points to capture data from the handset 2 and charge the battery within the handset 2.

FIG. 3 is the rear view of the Telescreen unit 1 and the base station 44. The back of the Telescreen unit 1 has two telescoping legs to support the unit when it is not attached to the base station 44. The horizontal telescoping leg 14b supports the Telescreen when the Telescreen unit is to be viewed in the horizontal position, i.e., wider as a standard television screen or computer monitor. The vertical telescoping leg 14a supports the Telescreen when the Telescreen unit is to be viewed in the vertical position, i.e., in standard document mode conforming more closely to an 8½"×11" sheet of paper.

The Telescreen as shown in FIG. 3 has three interface ports. A power socket 15 provides power from a base station 44 to the Telescreen when the Telescreen is attached to the base station 44. A serial digital socket 16 provides high-speed digital communications to be efficiently passed between the base station 44 and the Telescreen 1. A third socket is a multipurpose socket 17 for a twisted pair, Ethernet and POT (plain old telephone) communications. These three sockets and the surrounding mounting structure attach the swiveling and rotating head 46 of the base station 44. In another embodiment of the Telescreen 1 and base station 44 only two sockets are used, the power socket 15 and a digital communications socket 16, such as a USB socket. In that embodiment, all direct communications between the Telescreen 1 and the base station 44 pass through the digital communications socket 16.

The back of the base unit provides many connection sockets. A power socket 18 allows a power cord to supply electrical power to the base station 44. A serial digital socket 19 provides a port for the connection of a digital communications line. An Ethernet socket 20 is provided for connection to an existing Ethernet network. A 1394 socket 21 or Firewire connector is provided to allow communications with the base station 44 by this fast and efficient method. A printer port 22 allows a printer to be connected to the base station 44. A keyboard socket 23 provides access for an external keyboard to be attached to the base station 44. The keyboard provides an alternate form of data entry over the integrated (preferably, plasma) touch screen 3. The external monitor socket 24 provides a port to connect an external monitor to the base station 44. The external monitor provides an alternate form of display over the integrated plasma touch screen 3. The POT socket 25 connects to a telephone line for communication over the wire/optical fiber based telephone systems.

Associated with the different communications lines and choices is a rate negotiation chip-set within the Telescreen unit 1 that determines the most cost effective way to transmit or receive a given communication. During slow or downtimes for the Telescreen unit 1, this rate negotiator chip-set polls suitable communication choices (i.e., local carriers, long distance carriers, cellular carriers, etc.) for the current rate information from companies the user selects. When a communication transmission is then to be sent, and in some cases received, the rate negotiation chip-set determines the most cost effective communications form, and company, to use.

As shown in FIG. 3, input and output sockets are also preferably included in the base station 44 for connection to audio and video peripherals. The base station has audio in for the right 26a and left 26b channels and audio out for the right 27a and left 27b channels. Video in 28a and video out 28b are also provided.

Figure 10A:
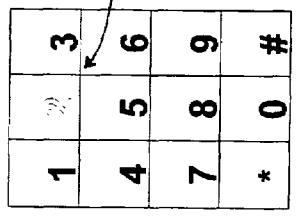
FIG. 10 shows another embodiment of a handset with displays for a cellular telephone function.
Figure 10B:
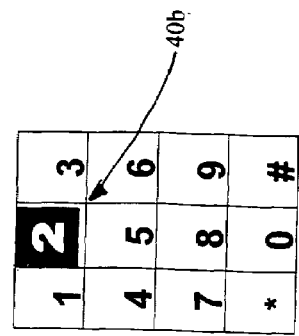

FIG. 4 shows the front view of the handset unit 2. The LCD or plasma touch screen 29 takes the majority of the area on the front of the handset unit 2. Preferably, the touch screen 29 is a full color display sensitive to touch. Like the plasma touch screen 3 of the Telescreen, this touch screen 29 provides a roll-over feature, much as a computer mouse will display the location of the mouse pointer on the screen, and a select feature with slightly more pressure, like a button click on the computer mouse. When the handset unit 2 is functioning as a remote control device for the Telescreen unit 1, a portion of the handset unit's touch screen 29 is mapped to a portion of the Telescreen's touch screen 3 and the roll-over feature of the handset unit 2 is echoed on the Telescreen's touch screen 3. Thus, when both touch screens are displaying a telephone keypad, both touch screens are inter-linked by the intercommunication between the Telescreen 1 and the handset unit 2 and the controlling computer programs active on each of the devices. For instance, when a user then touches the handset unit's touch screen 29 over the #2 button of the phone keypad displayed on the touch screen 29, the #2 button on both the Telescreen's touch screen 3 and the #2 button on the handset unit' touch screen 29 are displayed in the "depressed" view 40a (see FIG. 10A). Should the user press slightly harder on the handset unit's touch screen 29, the #2 button on both the Telescreen's touch screen 3 and the #2 button on the handset unit's touch screen 29 are displayed in the "selected" view 40b (see FIG. 10B) and the number 2 is entered as input to the active programs on the handset unit 2 and the Telescreen unit 1. The rollover function simply provides that the areas of the touch screen 29 that are defined for some action or entry when touched, change their appearance when the user moves their finger over the area. FIG. 10A shows only one such way to display the defined area as "depressed." FIG. 10B show one way to display the area as "selected." It would be apparent to one skilled in the art that the "depressed" and "selected" indication may be displayed in a number of ways including the use of color, shading and other graphical display options.

The handset unit 2 may also function as a remote using IVR technology to allow voice commands to be interpreted and sent to the Telescreen unit 1 for, e.g., volume, channel selection and function control when used for television display. The IVR technology may be used within the handset unit 2 itself for applications such as speed dialing for its telephone operations, shutter release for the camera and volume, selection and function control when used for music reception.

A speaker 31 and microphone 32 are disposed in the front of the handset unit 2. As shown in FIG. 5, the handset unit 2 has a button 37 for activating the digital camera. The digital camera function is discussed further in relation to FIG. 11. The right side of the handset unit 2 also contains a headset jack 38 for plugging in headphones so that the user may listen privately to content provided through the handset unit 2.

FIGS. 8 and 9 show the top and bottom of the handset unit 2. There is a channel in the bottom 30a and top 30b of the handset unit 2 for snapping the handset into the Telescreen against the dowels 6 and to facilitate data capture for the handset unit 2 and to charge the unit. In the top of the handset unit 2 is a laser scanner unit 39 allowing the unit to read and process coded information, such as barcodes. The laser reading device is used in the many personal as well as commercial applications of the Telescreen. In the medical field, prescription bottles can be quickly identified using bar coding. In a law office or court application, documents may be identified by bar code. Inventory applications may identify the inventory by a special bar code tag or by the standard UPC. With the laser scanner 39 in the portable handset unit 2, the information can be uploaded to the Telescreen 1 for further processing. Consumers may use this feature to compare prices of items between retailers. Just a few of the possible applications are recited here. One skilled in the art will appreciate there are many more applications for a device functioning as the handset unit 2 in this laser scanner mode.

The bottom of the handset unit 2 contains a card slot 35. The card slot 35 allows insertion of a card into a card reading unit within the handset unit 2. The card unit reads and writes optical-magneto cards, and also reads credit cards, debit cards, phone calling cards, driver's licenses, SmartCards, etc. Debit cards, credit cards, calling cards and other electronic money systems allow users to use the cell phone or satellite communication capabilities of the handset unit 2 by automatically placing the charges for the call on the card account. SmartCards and other security/identity card systems allow a level of security to be imposed upon users of the handset unit 2. The handset unit 2 is able to lock out designated data in the absence of the security card. When the identity of the user is ascertained by the use of a card, the handset unit 2 is also able to provide the individual's predefined interface screens and system preferences, as is done in the Telescreen above. Of course, it is recognized that many credit card type systems record the identity of the user on the card and identity card systems may have charge accounts associated with them. Thus, users may be granted security access linked to card most appropriate for their use and the charge account may be selected once identity is confirmed.

FIG. 6 shows the left side of the handset unit 2. On the left side of the unit is a rotating switch 33 which controls the speaker 31 in the handset unit 2 when the unit is functioning as a telephone. In a first position, the speaker 31 is turned off and when an incoming call is detected the handset unit 2 does not audibly ring. Rotation away from the first position preferably turns the speaker 31 on and increases the volume as the switch is turned, to a set maximum. In this way the rotating switch 33 turns the ringer off or on and sets the volume of the ring in the handset unit 2.

The second feature on the left side of the handset unit 2 is a standard phone jack 34. The handset unit 2 may be plugged directly into a telephone line. This is particularly useful when in times of power outage or the battery is low and should there be a complete failure of the Telescreen unit. The handset unit 2 is capable of functioning as a hand held telephone, when directly connected to a telephone line by the jack 34.

The back of the handset unit 2 is shown in FIG. 7. A portion of a laser reading unit 39 is visible from the back of the handset unit 2. The lens 36 for the digital camera is also located on the back of this embodiment of the handset unit 2. The lens 36 has an automatic retracting lens cover 36a.

Figure 10:
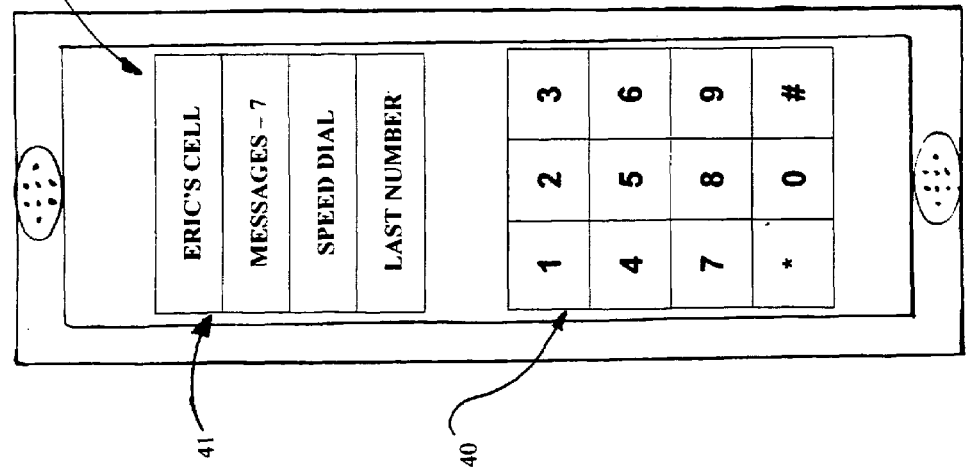

The versatility of the Telescreen 1 and handset unit 2 and the interaction of the two provide the user with a multi-functioning device to manage the many kinds of digital information and communications. In FIG. 10, an embodiment of the handset unit 2 is shown with the touch screen 29 configured as a cellular phone. The handset's interfaces are highly configurable and this depiction shows only one possible layout of the information that can be displayed. In this configuration, a telephone digit pad 40 is located in the lower half of the touch screen 29. This phone pad 40 maps to a portion of the Telescreen when the handset unit 2 is functioning as a cordless phone, using the Telescreen to access the phone line.

Telephone communications are greatly augmented using the Telescreen unit. When the user dials a number, either on the handset unit 2 or the Telescreen touch screen 3 directly, and the dialed number has any type of graphic available, additional features of this system are evoked. These graphics may be standard or customized web pages from current servers. Because the Telescreen unit is capable of providing a static Internet connection, it allows for standard telephony/website integration. The user's Telescreen displays video push from the system at the site dialed. Many types of information are suitable for this use. For instance, restaurants may provide menus that the Telescreen user may use interactively to place orders and retailers may place their catalogues in the Telescreen user's touch screen 3. The information displayed on the touch screen 3 may contain the video or static images sent with the logical layer above the images that displays icons or may designate areas of the screen to react to the user's touch. In this way the image of a menu page is displayed on the Telescreen. A layer defined logically above the image displayed separates the touch screen into areas that are given meaning when selected by touching the touch screen 3. For instance, if the user touches the area of the menu where the description of the egg rolls is displayed, an order of egg rolls is added to the order. In addition to designating of activity on the screen, icons are placed in the logical layer above the image supplied. In the menu function, for instance, icons for turning the pages of the menu, exiting the menu and going to the payment screen may be selected. If the payment screen is selected by selecting this icon, the user would see a summary of the purchases and would be able to insert a credit card in the card reader 12 to pay for the items.

Icons can also change the context of the information displayed. For instance, if an ingredients icon is pressed and then the area of the screen above the description of the egg rolls is pressed, instead of adding an order of egg rolls to the order, the list of ingredients of the egg rolls is displayed on the Telescreen. An icon to speak to person at the number would often be displayed. The Telescreen user then uses the handset unit 2 as a telephone to speak directly to someone at the number dialed or uses the Telescreen as a speakerphone.

More complex sites may provide specific information and services. One such example is a stock brokerage. Portions, or all, of the Telescreen's touch screen 3 may display advertisements in still or video form. The touch screen 3 is defined with areas that, when touched, would evoke other screens and information. The brokerage could supply information about specific stocks and the overall market as requested by the Telescreen user, and then push video to a section of the Telescreen where the brokerage shows informational videos on companies it believes to be hot stock picks. If the Telescreen user touches the screen where the information video is showing, information on the company being profiled is displayed with the current trading information and an order screen so that the user may purchase the stock.

Advertisements are not necessarily required to be related to the site dialed. For instance, one site could provide entertainment such as music or video on demand and run advertisements in portions of the Telescreen related to purchasing cars. If the user touched the truck in the advertisement, information on the specification and options on the vehicle could be displayed, with the video supplied on demand either continuing or pausing as the user or advertiser dictates.

This logical second layer of the touch screen definition allows enhancements to the information displayed when the Telescreen is in the television viewing mode. For instance, during a popular show the server providing the local video feed to the Telescreen may overlay icons on the screen or designate sections to provide additional information for interested Telescreen users. For instance, the user may touch the clothes being worn by the models on the Telescreen and local retailers are then listed or a form to order the item selected.

A national truck commercial shown during a traditional commercial break provides more information on the model displayed when the user touches the touch screen 3 on the truck. A local server providing the video feed is able to overlay an icon allowing the Telescreen user to select it to receive information about local dealerships or dial the dealership and communicate directly, while servers providing the national or regional feed could set icons and active areas of the screen for information on the make and model shown, its specifications and options. An icon placed on the screen could connect the Telescreen user to the Internet and load the web pages of the local dealer or the national manufacture. Many other applications exist for this technology as would be readily apparent to one of ordinary skill in the art.

Returning to FIG. 10, the informational portion 41 of the touch screen 29 displayed indicates the handset unit 2 is in current use as a cellular telephone. The top block indicates the screen presented and the function chosen, e.g., Eric's Cell. This indicated the user is Eric as defined by a identification card inserted in the handset unit 2 or by user identifier and password, or possibly this handset unit 2 is coded to be Eric's only. Each handset unit 2 may be coded with a unique serial number and that number allows the Telescreen to identify it and allows public kiosks to identify Eric as the owner and/or user.

The second word displayed is "Cell" indicating the handset unit 2 is in the operation mode of a cellular phone. The handset unit 2 communicates through the Telescreen as a cordless phone when within range of a Telescreen to which it is allowed access. A computer program within the handset unit 2 uses information about the connection source to select the cheapest way to make a call. The handset unit 2 normally selects cellular communications only when it is outside the range of a Telescreen to which it is granted access and within the range of cellular transponders. The handset unit 2 normally selects satellite communications, such as the low orbit satellite communications of IRIDIUM, when it is outside the range of cellular transponders, if the optional satellite communications package was installed in the handset unit 2. Each automatic selection may be overridden by user selection. Pressing the present mode area of the screen (see FIG. 10: the "Eric's Cell" block), allows the user to change the mode of the handset unit 2.

In the present "Eric's Cell" mode many of the functions of a cellular phone are displayed. The user is alerted that the handset unit 2, functioning as a messaging service, has stored 7 messages. These messages may be accessed by pressing that area of the touch screen 29 inside the box in which "Messages—7" is written. Speed Dial allows the user to press the pre-coded number on the keypad 40, or to scroll through a listbox that will appear in the control area's 41 space when this area is touched. Last Number will redial the last number dialed. Other features may be added to the user's cellular phone interface as modified by the user. Any such modifications from the defaults will be stored in the handset unit 2 for use when Eric is using the cellular telephone mode of the handset unit 2. In addition, the pre-coded speed dial numbers may be set only for Eric or set for all users of this handset unit 2. The speed dial settings may be uploaded and downloaded from the Telescreen unit I when the handset unit 2 is snapped into the Telescreen unit 1 or when the handset is otherwise in communication with the Telescreen unit 1. The speed dial number may be uploaded or downloaded to an optical-magneto card inserted into the card unit 35 in the handset unit 2, as well. Similar interfaces to the one shown in FIG. 10 are provided for cordless telephone and satellite communications modes.

When the handset unit 2 is receiving an incoming call the unit rings in accordance with the setting of the rotating switch 33 and an area on the touch screen labeled "Answer" flashes. When the "Answer" area is touched by the user the touch screen 29 displays the interface for the appropriate telephone service (cordless, cellular or satellite) and the call is received by the handset unit 2.

Public kiosk locations allow communication with the user's home unit and servers that contain the personal preferences and applications of the user. Public kiosk locations also allow the user to communicate through a kiosk-provided Telescreen unit as they could their primary Telescreen unit 1, much as public phones allow access to their system. Public kiosk Telescreens may be used, as a user's primary unit may be, with their own handset unit 2 serving as a remote control. The public kiosk Telescreens allow remote control by way of a standard cellular phone as well. In this mode, the Telescreen maps the cellular phone's keypad to choices on its screen much like a menu driven system. Alternatively, the display may be sectioned into nine sub-areas and the keypad numbers 1-9 of the cellular phone map to a touch in the corresponding area of the screen (i.e., a "1" corresponds to the upper left most ninth of the screen).

Public kiosks allow the user to gain access to all their personal information as they would at their primary Telescreen unit 1. Services, such as unified messaging of E-mail, voice and video messaging, allow the public kiosk to provide the user access to their personal information.

Figure 11:
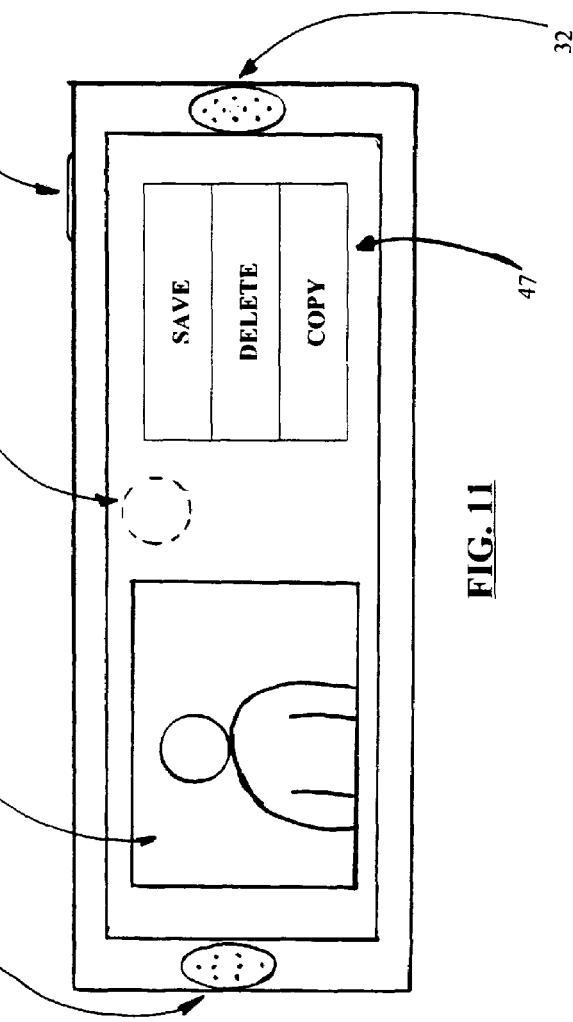
FIG. 11 shows another embodiment of a handset with displays for a digital camera function.

FIG. 11 shows an interface for the digital camera functioning of the handset unit 2. The handset unit 2 displays the image captured by the camera lens 36 in a portion of the touch screen 42. The camera button 37 controls the shutter of the camera in making still images. The control area displayed on the touch screen 47 allows the user to save the image to memory, delete an image or copy the image displayed. Saved and copied images may be uploaded when the handset unit 2 is communicating with the Telescreen unit 1.

The handset unit 2 has the capability of receiving pager messages. The handset unit 2 stores the messages in its available memory for later viewing or listening. A configuration of the touch screen 29 similar to the cellular phone panel is used to interface with the handset unit 2 and retrieve the messages.

The handset unit 2 is preferably able to download music and video in MPEG 3+ format for replay on its screen and speakers. Thus, video messaging may be handled in the unit. The handset unit 2 may receive digitally encoded music and can function as a portable player of "on demand" music. "On demand" music and video is delivered to the handset unit 2 at the request of the user. The source of the music may be stored files within the handset unit 2, or stored on the Telescreen unit 1 and communicated by cordless technologies to the handset unit 2. Outside servers of music may communicate with the handset unit 2 through the Telescreen 1 (and then by cordless technologies to the handset unit 2) or directly to the handset unit 2 by cellular or satellite technologies. Note, a user of the handset unit 2, in this way may access various audio content, such as music, news, sports information and audio books.

The handset unit 2 preferably has within it a GPS (Global Positioning Satellite/Service) unit that allows the handset to record its location upon request. This function may be employed by users to find their position when the handset unit 2 is in their possession. Additionally, the handset unit's position may be determined remotely by the Telescreen unit requesting the GPS unit within the handset unit 2 to report its position. This may be achieved by cordless transmission, followed by cellular and satellite transmission requests until the handset unit 2 reports its position to the Telescreen unit. This is a security feature and does not require the unit to report to one in possession of the handset unit 2 that the GPS function has been requested. The owner, who is able to uniquely identify the unit, may track a lost or stolen handset unit 2.

Figure 12:
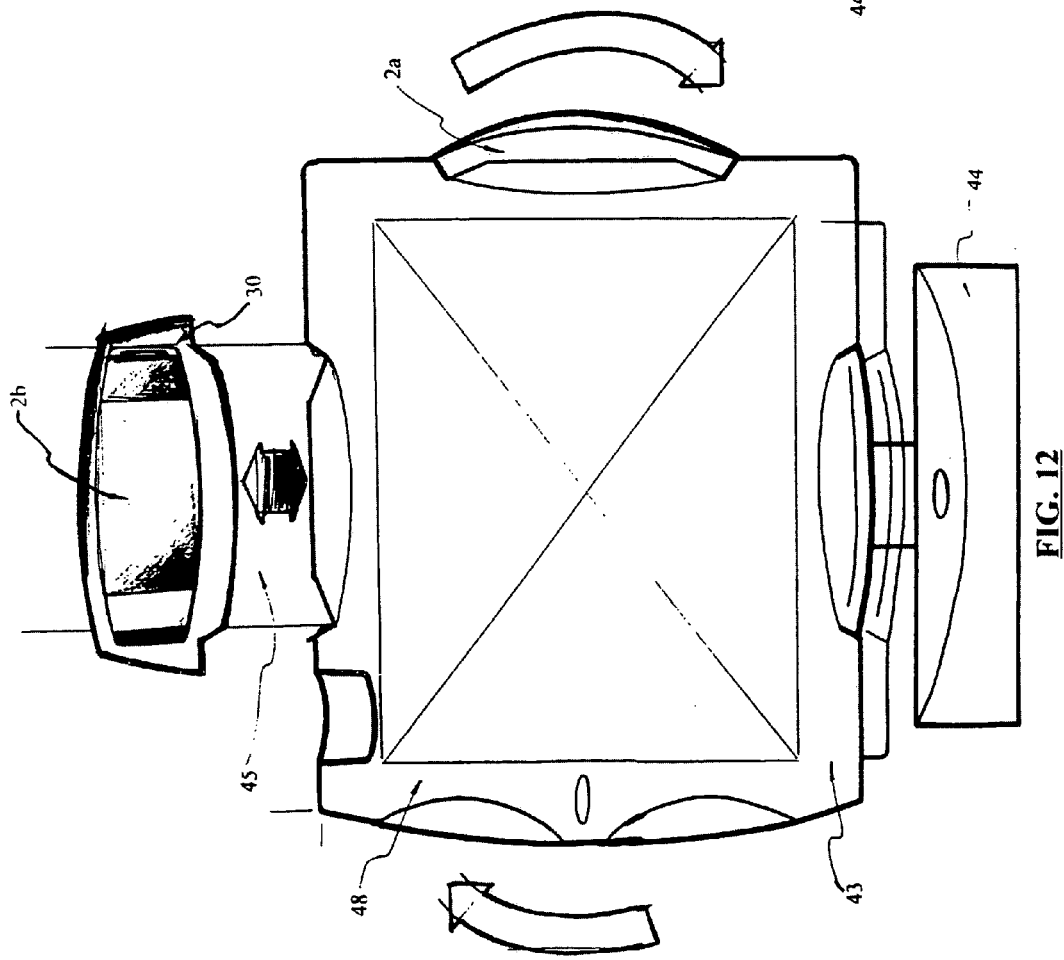
FIG. 12 shows the front view of one embodiment of a Telescreen unit attached to the base station with the screen rotated; additionally the front mount attachment for the handset is shown.

FIG. 12 shows a second embodiment of the Telescreen unit 43 in the vertical orientation. In this orientation the unit is in the up position when the power button is centered and at the top of the touch screen 48 and the touch screen has the longer dimension disposed vertically in the Telescreen casing 43. This orientation conforms more closely to an 8½"×11" page of a document. The Telescreen unit in this figure is rotated 90 degrees counter-clockwise on the base station 44 to show that the unit may be rotated to be viewed as the current user would prefer. Sensors in the base station's rotating head 46 transmit to the Telescreen the current orientation of the Telescreen unit. Software corrects the display to its proper orientation on the touch screen 48 from the data received from the sensor in the rotating head 46.

Also shown in FIG. 12 is the optional Front Facing Docking unit 45. This unit allows a the docking unit to be accessed from the front of the Telescreen 43. The handset unit 2*b* is slightly recessed into the front facing docking unit 45 and the dowels 30 at each end of the docking unit hold the handset unit 2*b* in place. The handset unit 2 in this position, facing the same direction as the Telescreen, adds additional display area to the front of the screen. Applications within the Telescreen are able to detect the used of the Front Facing Docking unit 45. The applications will send information to be displayed on the handset unit 2 in the orientation indicated by the docking station 5*a*, 5*b* or 5*c*, to which the Front Facing Docking unit 45 is attached.

Figure 13:
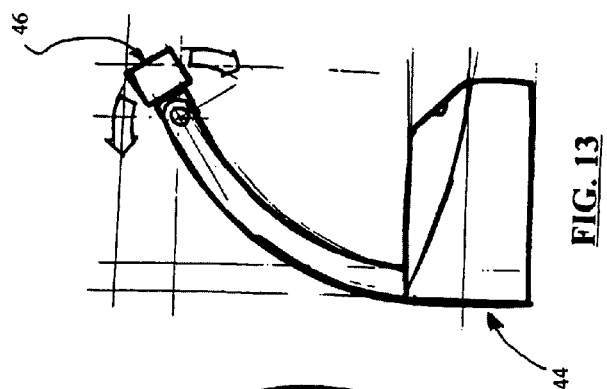
FIG. 13 shows the left side view of one embodiment of a base station depicting the angular rotation of the attachment head for the Telescreen unit.

FIG. 13 show the left side view of the base station 44. The angle of the arm holding the rotating head units 46 may be appreciated. FIG. 13 also shows the base's head unit 46 may be swiveled up and down as indicated by the arrows.

FIG. 14 shows how the Telescreen unit 1 may be mounted in a wall 50. This would be particularly useful when the unit is dedicated to a security system use.

FIG. 15 shows an alternative configuration of the Telescreen and base unit. As can be seen by comparing this embodiment with that shown in FIG. 3, the input and output sockets may be configured in different arrangements. In this embodiment the A/V RCAs inputs and outputs 100, particularly L1 in Audio; R1in Audio; L2 in Audio; R2 in Audio; L1 out Audio; R1 out Audio; video in; and video out are located together. The Firewire socket 101, S-link/USB 102, Gig+ Ethernet socket 103, POTs line socket 104, serial digital socket 106 and power socket 105 are on the opposite side of the center line of the base unit.

FIG. 16 shows an embodiment of the Telescreen in a SLIMLINE configuration. The SLIMLINE Telescreen 118 has a casing that minimally covers the edges of the touch screen unit. The DVD/ CD/DVD ROM/MINI ROM read/write units 108*a* and 108*b* are accessed through slots in the top of edge of the Telescreen casing. SMART CARD/credit card/driver's license/business card reader 109 is accessed through a slot in the side edge of the Telescreen casing. The radio frequency identification unit 109*a*, is located within the Telescreen casing and not apparent from an eternal view. The speakers 117*a* and 117*b* are located on their respective sides of the SLIMLINE Telescreen unit 118. The microphone 107*a* is located in the top edge of the casing and the camera lens 107*b* is located in the upper right corner of the touch screen. The SLIMLINE Telescreen is capable of remote control by the handset unit 2 as Telescreen unit earlier described. However, no docking station for the handset unit 2 is provided in this embodiment of the SLIMLINE Telescreen 118.

FIG. 17 shows the rear view of the SLIMLINE Telescreen 118 of FIG. 16 with the DVD/CD/DVD ROM/MINI ROM read/write units 108*a* and 108*b*, slots in the top of edge of the SLIMLINE Telescreen casing and the SMART CARD/credit card/driver's license/business card reader 109 slot in the side edge. The input and output sockets on the base unit in a previously described embodiment are place directly on the SLIMLINE Telescreen 118. The audio/video RCA inputs and outputs 110 are located on the back of the SLIMLINE Telescreen 118. As is a Firewire socket 111, a S-link/JSB 112, a Gig+ Ethernet socket 113, a POTs line input 114, a serial digital socket 116 and a power socket 115. A retractable base stand 118*a* may be folded down to steady the SLIMLINE Telescreen 118 in an upright position. When in the retracted position, the retractable base stand 118*a* fits into a slotted groove in the back of the SLIMLINE Telescreen casing fitting into place to provide a smooth back surface.

Figure 18:
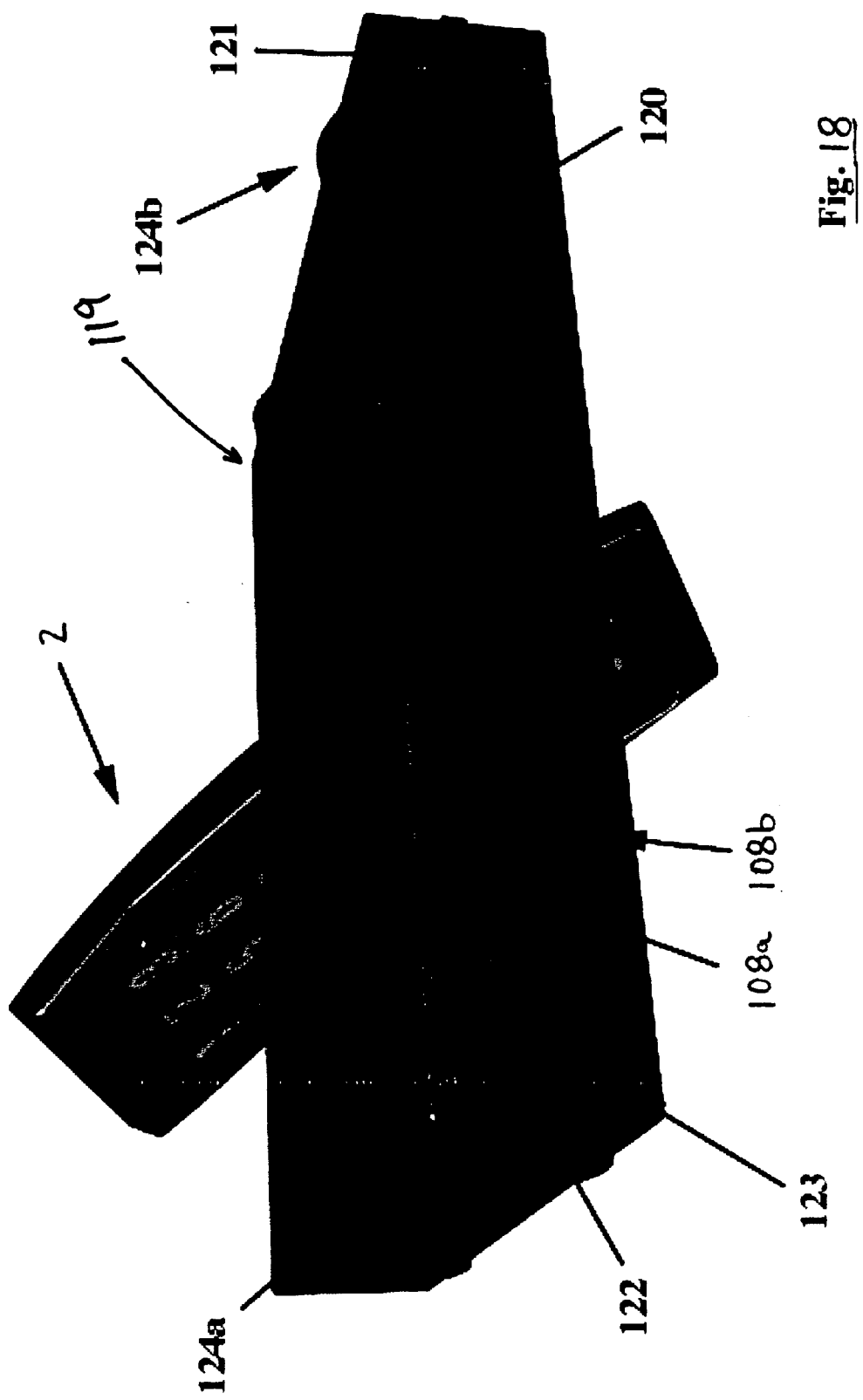
FIG. 18 shows an embodiment the Telescreen set top box.

FIG. 18 shows an embodiment of the set top box embodiment of the Telescreen. The set top box 119 provides much of the functionality of the Telescreen unit when a standard television is attached to the unit. The handset unit 2 acts as a remote for the television attached to the set top unit 119 and handset's touch screen maps to the screen projected on the television and roll-over and other features discussed above are functional. The television does not have the touch screen functions of the Telescreen unit, however all other functionality is included. DVD/CD/DVD ROM/MINI ROM read/write units 108*a* and 108*b* and a SMART CARD/credit card/driver's license/business card reader 120 are located facing the front of the set top box 119. A radio frequency identification unit 121, a microphone 123 and a camera lens 122, as seen in the earlier embodiments of the Telescreen, are located in the front of the set top box 119. The speakers 124*a* and 124*b* are located on their respective sides of the set top box 119.

Figure 19:
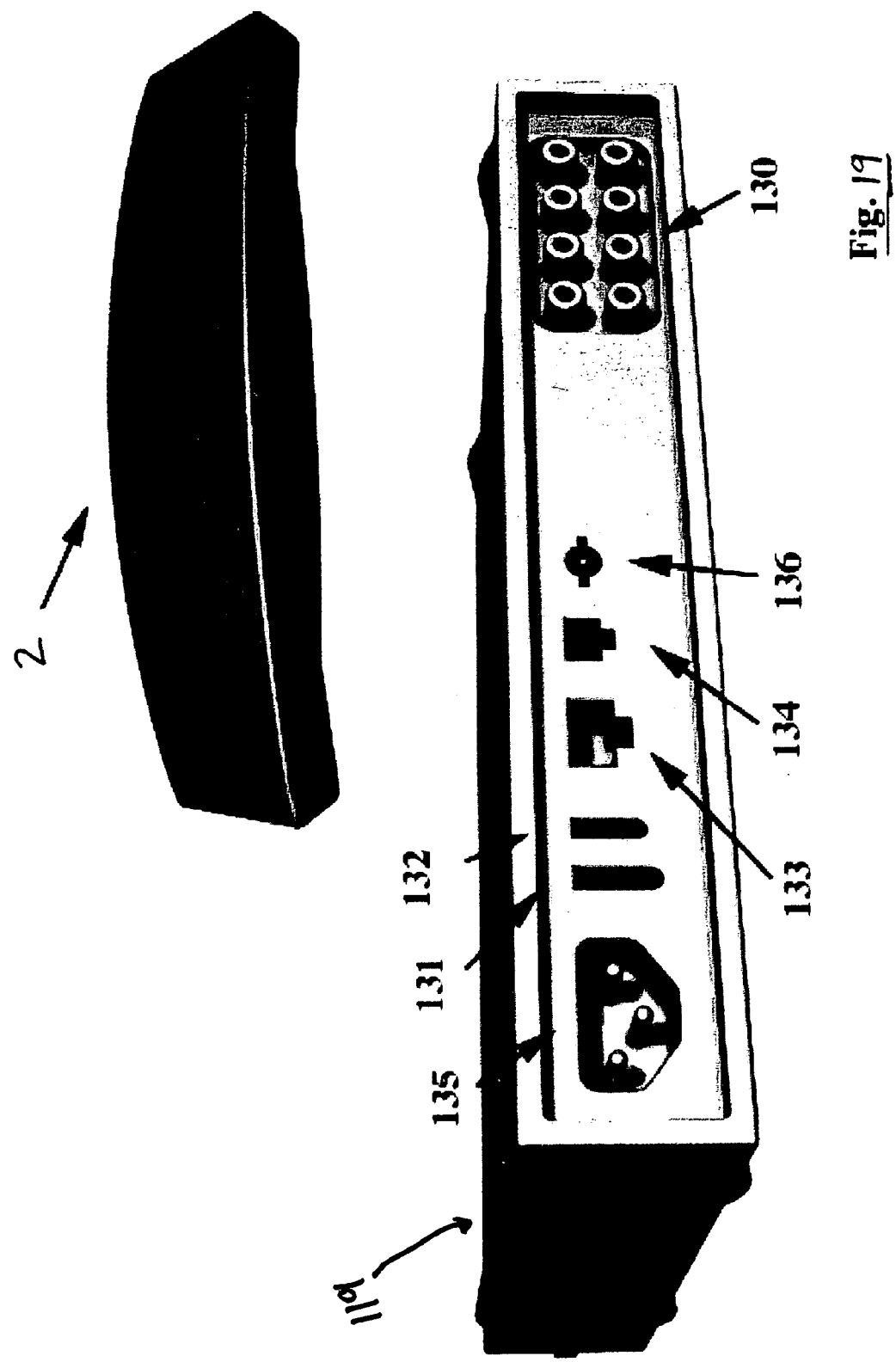
FIG. 19 shows the back view of the Telescreen set top box embodiment.

FIG. 19 shows the rear view of the set top box 119. The input and output sockets on the Telescreen base unit in a previously described embodiment are on the rear of the set top box 119. The audio/video RCA inputs and outputs 130, a Firewire socket 130, a S-link/USB 132, a Gig+ Ethernet socket 133, a POTs line input 134, a serial digital socket 136 and a power socket 135 are located on the rear of the set top box 119.

Figure 20:
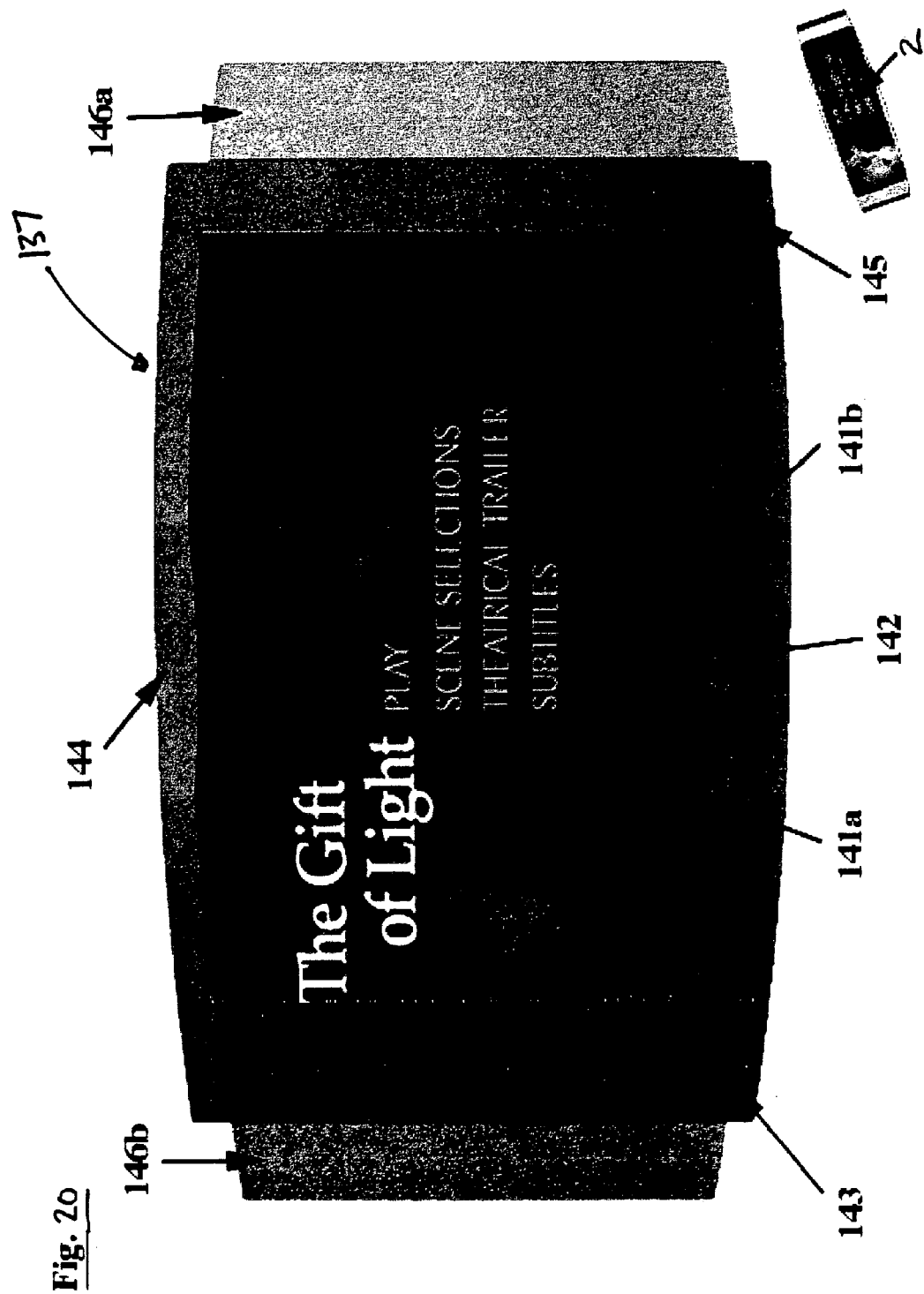
FIG. 20 shows an embodiment of the flat screen Telescreen TV.
Figure 21:
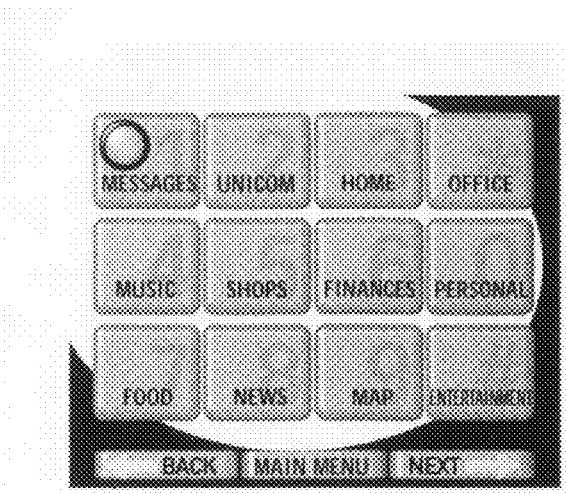
FIG. 21 shows a interface running on the Telescreen for a personal or home use.
Figure 22:
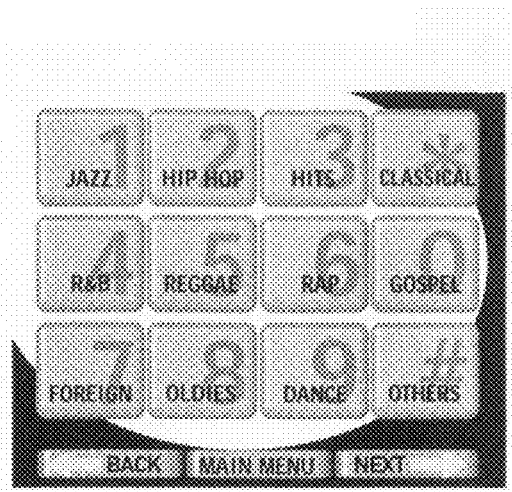
FIG. 22 shows a interface running on the Telescreen for selecting music to be played.
Figure 23:
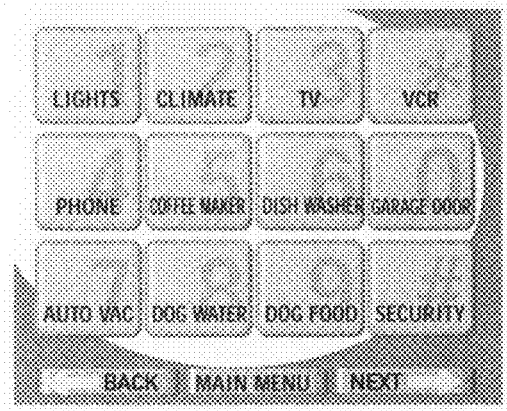
FIG. 23 shows a interface running on the Telescreen for home control.
Figure 24:
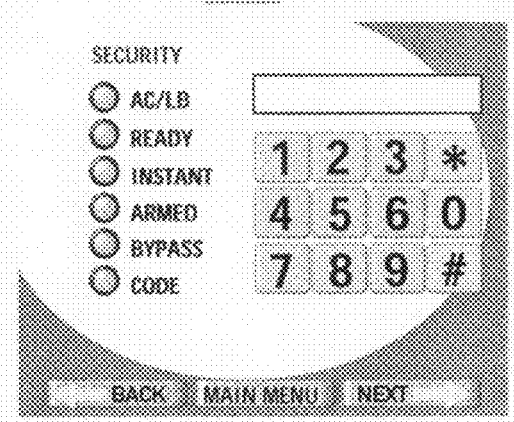
FIG. 24 shows a interface running on the Telescreen for a security system.
Figure 25:
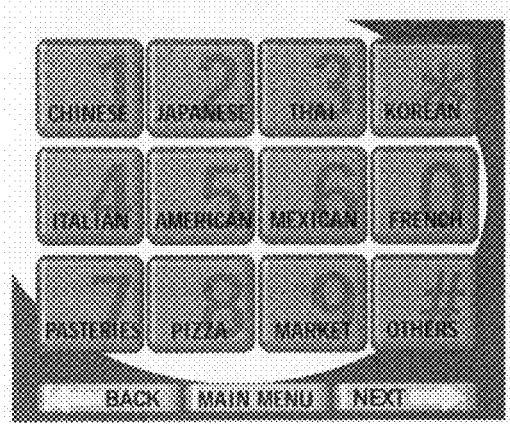
FIG. 25 shows a interface running on the Telescreen for selecting and ordering food for delivery.
Figure 26:
FIG. 26 shows a interface running on the Telescreen displaying a menu from a restaurant in an interactive mode.
Figure 27:
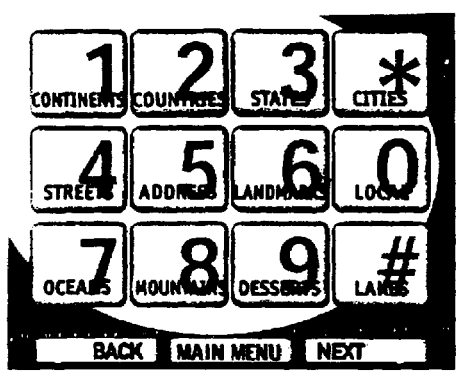
FIG. 27 shows a interface running on the Telescreen for selecting topographical, political or street maps.
Figure 28:
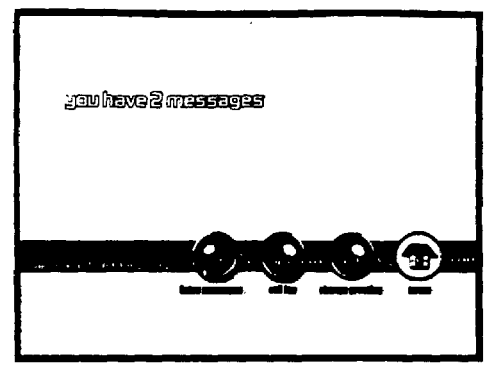
FIG. 28 shows a interface running on the Telescreen for providing unified messaging.

Finally, FIG. 20 shows the Telescreen unit in the flat screen Telescreen TV configuration. The flat screen Telescreen TV 137 embodiment incorporates a large diameter flat screen television (TV) into the Telescreen unit. The flat screen may once again be a LCD, plasma or similar display that may or may not have a touch sensitive screen. The handset unit 2 will once again function as a remote for the flat screen Telescreen TV 137. The interaction between the handset unit 2 and the flat screen Telescreen TV 137 is as described above for the Telescreen unit 1. This embodiment of the Telescreen is particularly suited to teleconferencing and for use as a home entertainment unit. The flat screen Telescreen TV 137, as the previous embodiments of the Telescreen, contains two DVD/CD/DVD ROM/MINI ROM read/write units 141*a* and 141*b* a SMART CARD/credit card/driver's license/business card reader 142, a radio frequency identification unit 143, a microphone 145 and a camera 144. The left and right channel speakers 146*a* and 146*b* are located on their respective sides of the flat screen Telescreen TV 137.

Figure 29:
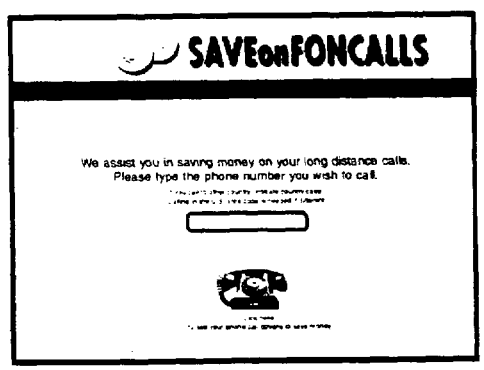
FIG. 29 shows a interface running on the Telescreen for providing alternative routing of telephone calls for optimal savings.

FIGS. 21 to 28 are examples of interface screens that may be displayed and used to interact with the Telescreen unit. A general menu interface as in FIG. 21 may lead to more specific functions, such as music to be played through the Telescreen or handset units, as in FIG. 22. A home control interface, FIG. 23, may allow monitoring and adjustment of many appliances and systems within the home. Security functions may be controlled from a Telescreen or handset unit, see FIG. 24. Ordering food FIGS. 25 and 26, and any other purchase may be conducted over the Telescreen through a constructed interface provided by the local machine or the business once contacted by a user employing a Telescreen unit. Maps may be provided though an interface on the Telescreen or handset unit, FIG. 27. Messages may be handled through and interface, FIG. 28. And, the cheapest phone service may be selected by using a programmed interface on the Telescreen unit, FIG. 29.

As can be seen by the few examples given here, the Telescreen and handset units are may provide integrated solutions to many everyday functions. Telescreen units dedicated to specific purposes may be configured for optimal use for that function. For instance, hospital or marine uses of Telescreens may be designed having no openings in the Telescreen casing for easy cleaning and water resistance. Thus, they would not have the optical disk or card slots, but could retain all other functions. By providing examples of different uses and embodiments of the invention the inventor does limit the possible uses and alternate embodiments that are with in the scope of the claims of this patent. As would be apparent to one skilled in the art there are many additional embodiments and configurations possible that would be obvious from this disclosure (see Table I for an exemplary specification).

TABLE I

TELESCREEN ® PREFERRED SPECIFICATIONS:

2 DVD/CD & MINI ROM READ WRITES
RADIO FREQUENCY IDENTIFICATION UNIT
CAMERA
MICROPHONE
SPEAKERS
POWER BUTTON
MULTI LAYER TOUCH SCREEN
CARD READER
SMART CARD/CREDIT CARD READER
BUSINESS CARDS
SMART CARD READER/WRITER

FIRE WIRE IN/OUT
S-LINK USB IN/OUT
CIGABYTE ETHERNET
TELEPHONE SOCKET
SERIAL DIGITAL IN/OUT
COMPOSITE VIDEO IN/OUT
2 RCA STEREO AUDIO IN
RCA STREO AUDIO OUT
HANDSET:

FULL COLOR TOUCH SCREEN
CORDLESS PHONE/CELL PHONE
REMOTE CONTROL
FOR TELESCREEN AND TV
FOR PUBLIC AND OTHER TELESCREENS
STILL/VIDEO CAMERA
BARCODE READER
CREDIT CARD/DRIVER'S LICENSE
SOFTWARE:

INTERACTIVE VOICE RESPONSE
PERSONAL AND BUSINESS INTERFACES
FRONT DOOR
VIDEO/STILL ANSWERING MACHINE/WEB PAGE FOR OTHERS TO SEE
BACK DOOR
ALL YOUR PERSONAL AND BUSINESS INfORMATION AND MEDIA WHEN AND WHERE YOU NEED IT.

Figure 30:
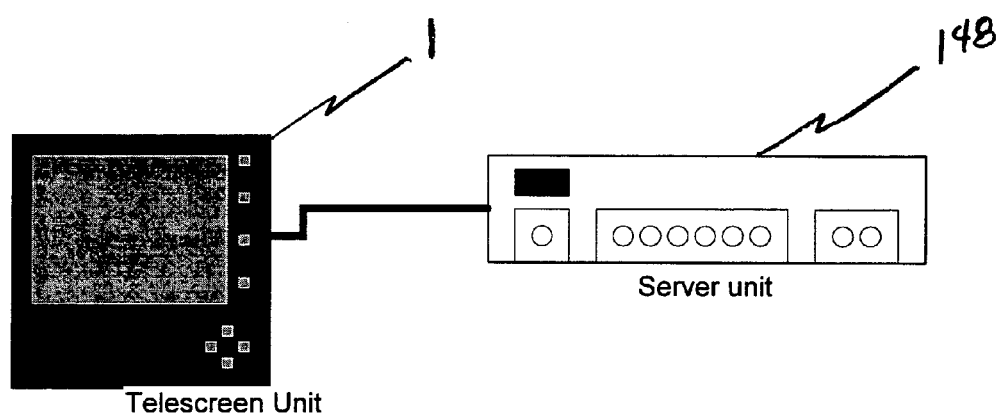
FIG. 30 shows the Telescreen unit attached by a communications path to a server unit.

FIG. 30 shows the Telescreen unit 1 physically attached to a server unit 148. The attachment need not be physical and represents the communication path between the two computers. The Telescreen, or first computer, may communicate to the server, or second computer, by the numerous ways such as telephonic, cellular, and satellite communications, as has been described in greater detail previously. The server unit 148 may be a dedicated local server, a regional or national server or another Telescreen unit. The server is able to transmit to the first Telescreen the data and images to be displayed on the Telescreen and the description of the active areas of the screen. The Telescreen then displays the images including any pushed video and then monitors the active areas described for a selection action. A selection action is a touch on the Telescreen's touch screen or a firm touch on the Handset unit's touch screen in an area that maps to an active area of the Telescreen's display. The selection action in a active area of the display is registered by the Telescreen and a corresponding code is then transmitted back to the server unit 148 for processing. Upon processing the selection, the server unit 148 then sends the next screen or updates the data in its memory and sends appropriate display and active area data to the Telescreen unit.

For instance, a server unit 148 may send a screen showing a picture of a truck to the Telescreen unit 1 with a description that the area corresponding to the truck as an active area of the Telescreen's touch screen. If a selection action is performed on that active area, the Telescreen will transmit the specified code back to the server unit 148 which may then send a screen listing the specifications of the vehicle and the options available to the Telescreen. Selecting an option listed may then prompt the server to send a new picture of the truck with the previously selected option.

National or regional servers may provide the underlying content for display on the Telescreen unit, such as the truck images, specifications and options and any push video set up on the server. Local servers may carry this information themselves or merely pass it on from the national servers. A local server may augment the information from the national servers by adding their local content.

In the simplest configuration, a Telescreen unit 1 contacts dedicated server for a particular function by direct dialing the telephone number associated with the server or linking directly to the site via the internet, using the URL (universal resource locator) associated with the server. Once a communications path is established, the server sends the data to be displayed on the Telescreen and the description of the active areas of the screen. This may be as simple as a restaurant menu, allowing the Telescreen user to order food for delivery, or more complicated, such as teleconferencing with separate areas of the Telescreen handling documents to be marked up and encrypting the entire transmission. As would be evident in a teleconferencing application between two Telescreen units, a Telescreen may in a single communication sequence function as both the first computer receiving data and the server Unit 148 sending data and active area descriptions to be displayed on the second unit.

Although the present invention has been described in detail with reference only to the presently-preferred embodiments, those of ordinary skill in the art will appreciate that various modifications can be made without departing from the invention. The invention will be best understood from the following description when read in conjunction with the accompanying drawings. The novel features of the invention are set forth with particularity in the appended claims.

I claim:

1. A method for communicating information between computers, comprising:
    entering into a first computer an input indicating a telephone number for an information source using an input device having a plurality of input elements arranged in a telephone keypad arrangement but without full alphabetic input elements;

the first computer obtaining from a database a network identification of the information source based on the telephone number;

the first computer establishing a network connection with a second computer of the information source using the network identification; and the first computer displaying information obtained from the second computer.

2. The method of claim 1, further comprising a step of the first computer establishing a voice telephone connection with the information source.

3. The method of claim 1, further comprising a step of the information source establishing a voice telephone connection with the first computer after the first computer establishes the network connection.

4. The method of claim 1, further comprising a step of the second computer pushing information to the first computer via the network connection.

5. The method of claim 4, wherein the first computer displays the information obtained from the second computer on a display screen of the first computer, and wherein the information pushed by the second computer includes identifying codes associated with one or more active areas of the first computer's screen, the method further comprising a step of the first computer communicating to the second computer identifying codes associated with active areas selected by the user.

6. The method of claim 4, wherein the pushed information includes video information.

7. The method of claim 4, wherein the pushed video information is interactive video information or smart video streaming information.

8. The method of claim 4, wherein the pushed video information is full screen broadcast quality video information.

9. The method of claim 1, wherein the database is pre-stored in the first computer.

10. The method of claim 9, wherein the pre-stored database is dynamically updated.

11. The method of claim 1, wherein the telephone and network connections are established via wired or wireless communication channels.

12. The method of claim 1, wherein the telephone and network connections are established via twisted-pair, broadband cable, fiber-optic, cellular, or satellite communication channels.

13. The method of claim 1, wherein the network connection is via the Internet and the network identification is a Universal Resource Locator (URL) or an IP address.

14. The method of claim 1, wherein the database is a database that links telephone numbers to network address information in a cross directory.

15. The method of claim 14, wherein the database further includes name or street address information associated with the telephone number.

16. The method of claim 15, wherein the input indicating a telephone number is the name associated with the telephone number.

17. The method of claim 1, wherein the first computer establishes a network connection with the second computer using the telephone number entered by the user as the only input from the user.

18. The method of claim 1, further comprising:

the first computer transmitting voice information from its user to the second computer after establishing the network connection; and the second computer recording the voice information.

19. The method of claim 1, further comprising:

the first computer transmitting voice information from its user to the second computer after establishing the network connection; and the second computer recording the voice information.

20. The method of claim 1, further comprising:

the first computer visually displaying a plurality of menu items each associated with a number between 0 and 9 or a special symbol; and the first computer transmitting a signal to the second computer indicating a user input in response to the visual display.

21. The method of claim 20, further comprising:

the user controlling the first computer using a telephone handset, a remote control device, a touch sensitive screen, or voice recognition.

22. A method of interfacing between a user and an information system including a plurality of networked computers, comprising:

the user entering into a first computer an input indicating a telephone number for an information source using an input device having a plurality of input elements arranged in a telephone keypad arrangement but without full alphabetic input elements;

the first computer obtaining from a database a network identification of the information source based on the telephone number;

the first computer establishing a network connection with a second computer of the information source using the network identification;

the second computer pushing information to the first computer via the network connection, the pushed information including identifying codes associated with one or more active areas defined for a display screen of the first computer;

the first computer displaying information received from the second computer to the user;

the user selecting one or more of the active areas using the input device; and the first computer communicating to the second computer identifying code associated with the selected active areas.

23. The method of claim 22, further comprising a step of the first computer establishing a voice telephone connection with the information source.

24. The method of claim 22, further comprising a step of the information source establishing a voice telephone connection with the first computer after the first computer establishes the network connection.

25. The method of claim 22, wherein the input device is a art of the first computer or a handset unit in wireless communication with the first computer.

26. The method of claim 22, wherein the input device is a handset unit in wireless communication with the first computer, the handset unit having a touch sensitive screen, at least a portion of the touch sensitive screen being mapped to a portion of the display screen of the first computer.

27. The method of claim 22, wherein the the input device is a handset unit in wireless communication with the first computer, the handset unit having numeric keys corresponding to active areas defined on the display screen of the first computer.

28. The method of claim 22, wherein the database is a database that links telephone numbers to network address information in a cross directory.

29. The method of claim 28, wherein the database further includes name or street address information associated with the telephone number.

30. The method of claim 29, wherein the input indicating a telephone number is the name associated with the telephone number.

31. The method of claim 22, wherein the first computer establishes a network connection with the second computer using the telephone number entered by the user as the only input from the user.

32. The method of claim 22, further comprising:
the first computer visually displaying a plurality of menu items each associated with a number between 0 and 9 or a special symbol;
the user proving the first computer an input in response to the visual display using the input device; and
the first computer transmitting a signal to the second computer indicating the user input.

33. The method of claim 32, where the input device is a telephone unit.

34. The method of claim 32, wherein the visual display is displayed on a touch sensitive screen, and the user input is provided using the touch sensitive screen on the input device.

* * * * *